(12) United States Patent
Heckman et al.

(10) Patent No.: US 12,149,769 B2
(45) Date of Patent: Nov. 19, 2024

(54) SELF-DRIVEN ADAPTIVE UPLOAD

(71) Applicant: Microsoft Technology Licensing, LLC, Redmond, WA (US)

(72) Inventors: Nicholas Tegan Heckman, Kirkland, WA (US); Ohad Atia, Redmond, WA (US); Nitin Suri, Redmond, WA (US); Steven Craig Peterson, Bloomington, MN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 184 days.

(21) Appl. No.: 17/841,033

(22) Filed: Jun. 15, 2022

(65) Prior Publication Data
US 2023/0412866 A1 Dec. 21, 2023

(51) Int. Cl.
*H04N 21/2743* (2011.01)
*H04N 21/2343* (2011.01)
(Continued)

(52) U.S. Cl.
CPC ..... *H04N 21/2743* (2013.01); *H04N 21/2343* (2013.01); *H04N 21/235* (2013.01); *H04N 21/8549* (2013.01)

(58) Field of Classification Search
CPC ........... H04N 7/17318; H04N 5/23225; H04N 21/23439; H04N 21/25833; H04N 21/2743; H04N 21/4788; H04N 5/23238; H04N 5/247; H04N 21/2541; H04N 21/854; H04N 21/21805; G11B 27/031
See application file for complete search history.

(56) References Cited

U.S. PATENT DOCUMENTS 7,095,905 B1 * 8/2006 Peterson .............. H04N 23/698
382/284
8,510,848 B1 8/2013 Zhao et al.
(Continued)

FOREIGN PATENT DOCUMENTS

CN 114390319 A 4/2022
EP 1980958 A2 10/2008
(Continued)

OTHER PUBLICATIONS

"International Search Report and Written Opinion Issued in PCT Application No. PCT/US23/019539", Mailed Date: Jun. 29, 2023, 14 Pages.
(Continued)

*Primary Examiner* — Alazar Tilahun
(74) *Attorney, Agent, or Firm* — Schwegman Lundberg & Woessner, P.A.

(57) ABSTRACT

A method and system for uploading a media file container from a first device to a second device are described herein, including receiving an instruction to upload the media file container and in response, reading a metadata box of the media file container to locate a track box containing information about video data in a media data box, identifying sample frames of the video data throughout a duration of the video data in the media data box using information from the track box, packaging the identified sample frames, and uploading the packaged sample frames of the video data prior to completing upload of the media file container.

20 Claims, 12 Drawing Sheets

(51) Int. Cl.
*H04N 21/235* (2011.01)
*H04N 21/8549* (2011.01)

(56) References Cited

U.S. PATENT DOCUMENTS

| | | | |
|---|---|---|---|
| 8,984,569 | B2 | 3/2015 | Hurst |
| 9,338,515 | B2 | 5/2016 | Hu et al. |
| 9,351,020 | B2 | 5/2016 | Good |
| 9,674,502 | B2 | 6/2017 | Park et al. |
| 9,843,606 | B1 | 12/2017 | Vendrow et al. |
| 2007/0058951 | A1 | 3/2007 | Kashiwagi et al. |
| 2010/0169390 | A1 | 7/2010 | Park et al. |
| 2011/0119327 | A1 | 5/2011 | Masuda |
| 2011/0280540 | A1* | 11/2011 | Woodman .......... H04N 21/8547 386/224 |
| 2012/0054370 | A1 | 3/2012 | Tsubakihara |
| 2013/0346626 | A1* | 12/2013 | Zhang ................. H04L 65/1069 709/231 |
| 2015/0281305 | A1 | 10/2015 | Sievert et al. |
| 2016/0088287 | A1* | 3/2016 | Sadi ....................... H04N 5/265 348/43 |
| 2017/0149860 | A1* | 5/2017 | Ben Eli ................ H04L 65/65 |
| 2019/0268601 | A1 | 8/2019 | Lu et al. |
| 2020/0329283 | A1 | 10/2020 | Yin |
| 2020/0396504 | A1* | 12/2020 | Yin ...................... H04N 21/435 |
| 2022/0109806 | A1 | 4/2022 | Sohoni |
| 2022/0116691 | A1 | 4/2022 | Stockhammer |
| 2023/0412669 | A1 | 12/2023 | Heckman |
| 2023/0412901 | A1 | 12/2023 | Heckman |

FOREIGN PATENT DOCUMENTS

| | | |
|---|---|---|
| WO | 2007082169 A2 | 7/2007 |
| WO | 2011108868 A2 | 9/2011 |

OTHER PUBLICATIONS

Non-Final Office Action mailed on Feb. 1, 2024, in U.S. Appl. No. 17/841,075, 13 pages.

Moseley, Robert, "Video Optimization, Part 2: Multi-Codec Adaptive Bitrate Streaming", Retrieved from: https://web.archive.org/web/20210502021010/https:/cloudinary.com/blog/video_optimization_part_ii_adaptive_bitrate_streaming_of_multiple_codecs, Sep. 10, 2018, 10 Pages.

Stockhammer, Thomas, "Dynamic Adaptive Streaming over HTTP—Design Principles and Standards", In Journal of Qualcomm Incorporated, Feb. 23, 2011, 3 Pages.

"Progressive Playback: An Atom Story", [online]. Retrieved from the Internet: <URL: https://fabiensanglard.net/mobile_progressive_playback/index.php>, Nov. 15, 2011, 5 Pages.

U.S. Appl. No. 17/841,116, filed Jun. 15, 2022.

U.S. Appl. No. 17/841,075, filed Jun. 15, 2022.

"International Search Report and Written Opinion Issued in PCT Application No. PCT/US23/019540", Mailed Date: Jul. 12, 2023, 12 Pages.

"International Search Report and Written Opinion Issued in PCT Application No. PCT/US23/021790", Mailed Date: Jul. 17, 2023, 11 Pages.

Final Office Action mailed on Aug. 30, 2024, in U.S. Appl. No. 17/841,075, 14 pages.

* cited by examiner

SELF-DRIVEN ADAPTIVE UPLOAD

TECHNICAL FIELD

The present disclosure generally refers to media file upload and more particularly to a self-driven adaptive media file upload from a first device to a second device.

BACKGROUND

Unified communication sessions provide a variety of meeting services, including audio, video, messaging, and screen, application, and file sharing capabilities to bring together and share information between various combinations of in-room, remote, or virtual participants for a shared meeting experience. Media data from unified communication sessions are often uploaded and processed, such as by a media service, for subsequent viewing or distribution.

SUMMARY

Embodiments of the present disclosure include a method and system for uploading a media file container from a first device to a second device, including receiving an instruction to upload the media file container and in response, reading a metadata box of the media file container to locate a track box containing information about video data in a media data box of the media file container, identifying sample frames of the video data throughout a duration of the video data in the media data box using information from the track box, packaging the identified sample frames, and uploading the packaged sample frames of the video data to the second device prior to completing upload of the media file container.

The claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, hard disk, floppy disk, magnetic strips, optical disk, compact disk (CD), digital versatile disk (DVD), smart cards, flash memory devices, among others. In contrast, computer-readable media (i.e., not storage media) may additionally include communication media such as transmission media for wireless signals, etc.

This Summary is provided to introduce a selection of concepts that are further described below in the Detailed Description. It is not intended to identify key features or essential features of the claimed subject matter, nor is it intended to be used to limit the scope of the claimed subject matter.

BRIEF DESCRIPTION OF THE SEVERAL VIEWS OF THE DRAWINGS

The disclosed aspects will hereinafter be described in connection with the appended drawings that are provided to illustrate and not to limit the disclosed aspects.

DETAILED DESCRIPTION

Figure 1:
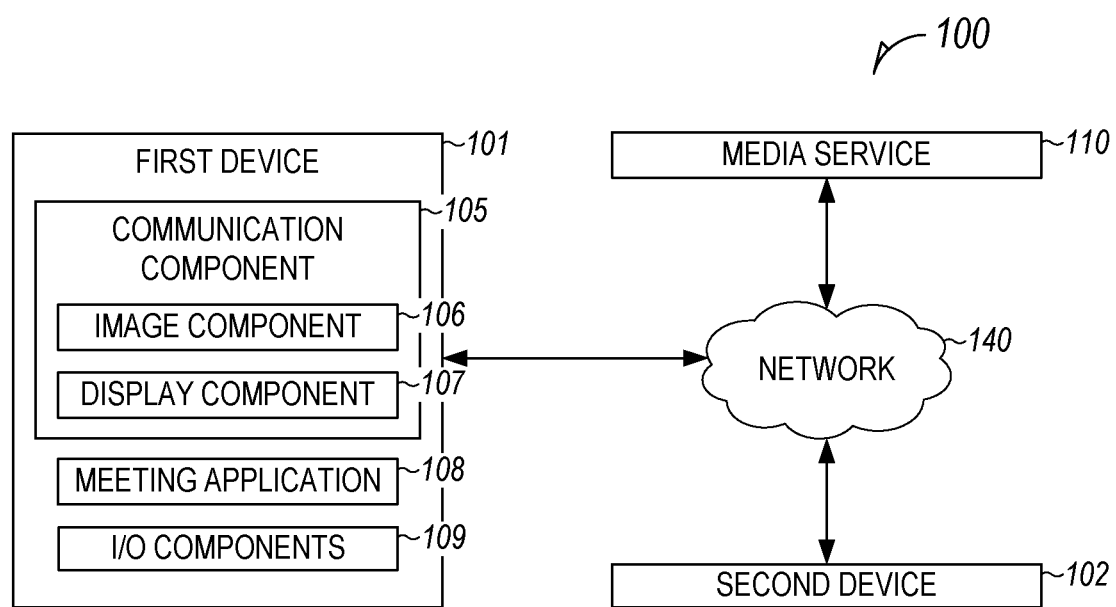
FIG. 1 illustrates an example system including a media service.

Unified communication sessions are often recorded, assembled, and encoded in media file containers, such as by a meeting application of a first device participating in the unified communication session, for later reference by meeting participants or consumption by others with permission to view. Media file containers can be uploaded to a media service for additional management, processing, distribution, etc. For example, media data in a media file container can be analyzed by the media service to identify and create representative images or thumbnails, to encode the media data in multiple bitrates for subsequent viewing or download, to create transcripts, to add closed captions or subtitles to a video of the media file, to separate audio data from other data in the media file container, to identify active speakers in the transcription, to add links between the transcript and audio or video data, to partition the media data into segments or portions, to create an index for the media file, to separate faces of presenters or attendees, to create scenes, to remove inactive periods in the audio or video data, to perform optical character recognition of provided text, to manage or enforce distribution, playback, or sharing different aspects of the media data, to remove, replace, or obfuscate specific content or brands, to implement machine-learning processes, etc.

Upload of a media file container having a size of N bytes, such as upload from a first device to a second device (e.g., one or more devices associated with a media service, etc.), is typically executed from byte 0 of the media file container to byte N (e.g., in separate packets, etc.). Downstream service processing of the media file container is typically blocked until upload is fully complete. Without the full media file container, there are no guarantees that upload of the media file container will complete without error. In addition, many downstream service processes require, if not all bytes of the media file container, specific portions of the media file container. However, the location of such specific portions of the media file container, such as metadata boxes of the media file container, etc., are often unknown without first receiving them.

A technical problem exists in that, as unified communication use and downstream service processing associated with uploaded media file containers increases, media services either must increase capacity, prioritize processing of specific media file containers at peak times, or otherwise provide services at a reduced performance.

The upload duration of a media file container depends on the size of the media file container. The size of the media file container depends on the duration and resolution of the media data in the media file container. The downstream service processing duration depends on the duration and resolution of the media data in the media file container, as well as the type of processing required. Downstream processing services often require 1-2× the duration of the video data of the media file container, and can include such services as creating and adding captions to video data of a media file container, creating image previews across the duration of the video data, creating moving image snippets of portions of the video data, creating a transcript of the media file container, indexing the video data of the media file container according to the captions or the transcript, etc. A media file container including video data having a duration of one hour can require between one and two hours of processing time. When capacity for downstream service processing is not immediately available, a queue can be formed. Placement in the queue, or estimates of the time until services are available, can depend on the amount and type of media data queued for processing.

In addition, the downstream service processing cannot start until the full media file container is uploaded. For example, one hour of high definition (e.g., 4K) encoded (e.g., H.264 encoding, etc.) video data can be about 1.8 GB of video data. Average upload speeds (e.g., 40 Mbps) can require between 6 and 10 minutes to fully upload the full media file container.

Further, more and more devices of varying type with different capabilities are performing unified communication sessions, leading to a greater diversity of sources creating and uploading media file containers, in different sizes or formats, with different processing, power, and data conditions or capabilities. Upload times from different device can vary based on device status (e.g., battery status of mobile devices, etc.), connection (e.g., waiting for a data connection instead of cellular to upload, etc.), other device commitments or responsibilities, etc.

The present inventors have recognized, among other things, a solution to the technical problem of limited resource capacity and management of a diverse set of connected devices using the technical solution of enabling a second device (e.g., a media service) of known resources to control when, how, and what specific content with respect to particular media file containers from one or more first device are uploaded to the second device, such as through settings of a meeting application executed on the one or more first devices and connected to the second device or in a response by the second device to an upload request by the one or more first devices, etc., to more efficiently utilize downstream service processing resources of the second device, increasing otherwise limited processing capacity and throughput. The second device can divide the downstream processing operations between the first and second devices, reconfiguring normal operation (e.g., downstream processing by the second device after upload from the first device) based on capabilities of the first device (e.g., hardware, codec, etc.), media data format, size, or duration, network bandwidth, processing queue, etc., thereby accelerating downstream processing and reducing processing costs at the second device.

In an example, the second device can control the byte range ordering of content of the media file container that is uploaded, such as to ensure that the second device has access to metadata of the media data in the media file container before the full content of the media file container is uploaded to the second device. In other examples, the second device can control time-ordering of uploaded content to achieve a desired outcome at the second device, such as by delaying upload or even upload requests to the second device, such as to ensure priority and data and processing bandwidth are maintained at the second device, etc.

In other examples, the second device can provide instruction to the first device to perform one or more other specific actions or transformations to the media data or portions of the media data in the media file container prior to uploading the media file container to the second device, depending on, among other things, resources associated with the second device for downstream processing, capabilities of the first device, etc. For example, the second device can instruct the first device specific transformations to the media data in the media file container prior to uploading the media file container to the second device, such as to transcode or transmux media data in the media file container from a first format to a second format that is more efficient to stream by a streaming protocol, to transcode the media data in the media file container to a multi-bitrate adaptive streaming format to account for different network bandwidths of subsequent viewers, or to transform or transmux specific portions of the media data in the media file container to accelerate downstream processing services, etc. The second device can instruct the first device to extract one or more audio tracks from the media file container and upload an audio bitstream to the second device as a separate media file prior to uploading the media file container to aid downstream processes, or to transcode the extracted one or more audio tracks form the media file container into one or more other different codecs, etc. The second device can instruct the first device to extract one or more images or video frames from the media data of the media file container, such as to create summary thumbnail images or a sprite map of the media data in the media file container, and to upload the extracted one or more images or video frames separate from the media file container, etc.

FIG. 1 illustrates an example system 100 including a media service 110 for managing a unified communication session between participants through meeting applications of respective user devices, such as a first device 101 (e.g., a mobile phone, laptop computer, desktop computer, tablet, or one or more other electronic devices) associated with a first user, such as a presenter or other meeting participant connected to the media service 110 over a network 140 through a meeting application 108 executed on the first device 101. A second device 102 can include a device associated with a second user of the unified communication session, such as a meeting participant connected to the media service 110 through a respective meeting application executed on the device, or a computing component of the media service 110 having a processor or processing capabilities configured to provide one or more services associated with the unified communication service.

In an example, the meeting application 108 can include a local client, such as a Microsoft Teams client, a Skype client, etc., installed on a respective user device and connected to the media service 110, such as a cloud-based media service device or platform (e.g., Microsoft Teams, Skype, etc.). In other examples, the meeting application 108 can include a virtual application (e.g., a network-, web-, server-, or cloud-based application) accessing resources of a respective user device, or combinations of a local client and a virtual application, etc. The media service 110 can manage unified communication sessions, including communication streams, such as emails, documents, chats, comments, texts, images, animations, hyperlinks, or voice or video communication for users associated with one or more online or other unified communication sessions through meeting applications executed on connected devices, such as the first device 101 or one or more other devices including hardware and software configured to enable meeting applications or one or more other communication platforms to communicate to or from the respective devices. In certain examples, the meeting application 108 can be configured to perform one or more multimedia services or processes to media data, such as media data in one or more media file containers, including reading, repackaging, reassembling, or otherwise processing or creating media files and content associated with a media file or media data in one or more media file containers, etc., such as disclosed in the commonly assigned Sohoni U.S. patent application Ser. No. 17/063,691 titled "FAST IN-PLACE FMP4 TO MP4 CONVERSION" or Lu et al. U.S. patent application Ser. No. 15/905,444 titled "EFFICIENT STREAMING VIDEO FOR STATIC VIDEO CONTENT", each herein incorporated by reference in their entireties including their description of capturing, creating, and converting media data into separate containers or container formats, etc.

The first device 101 is exemplary of user devices generally and can include a communication component 105 configured to communicate with one or more additional devices, either directly or through the media service 110, such as through the meeting application 108. The communication component 105 can be configured to send or receive information to or from the media service 110. The communication component 105 can include an image component 106, a display component 107 or one or more other components configured to adapt data for communication to a user or for transmission to one or more other devices. The image component 106 can be configured to send, receive, or store images associated with the media service 110. In certain examples, the images can include icons, such as emojis, representations of emotions (e.g., emoticons), pictures, drawings, avatars, profile pictures, representations of one or more users, etc. In certain examples, the image component 106 can include a repository of images of the first device 101 or otherwise associated a user of the first device 101 (e.g., cloud-based storage, online profiles, etc.). The display component 107 can be configured to display messages and other visual content associated with the communication component 105, such as using one or more input/output (I/O) components 109 or portions thereof, such as a display or portion of a display of the first device 101. The I/O components 109 can include one or more of a display, keyboard, mouse, touch-screen input, camera, microphone, speaker, etc.

Figure 2:
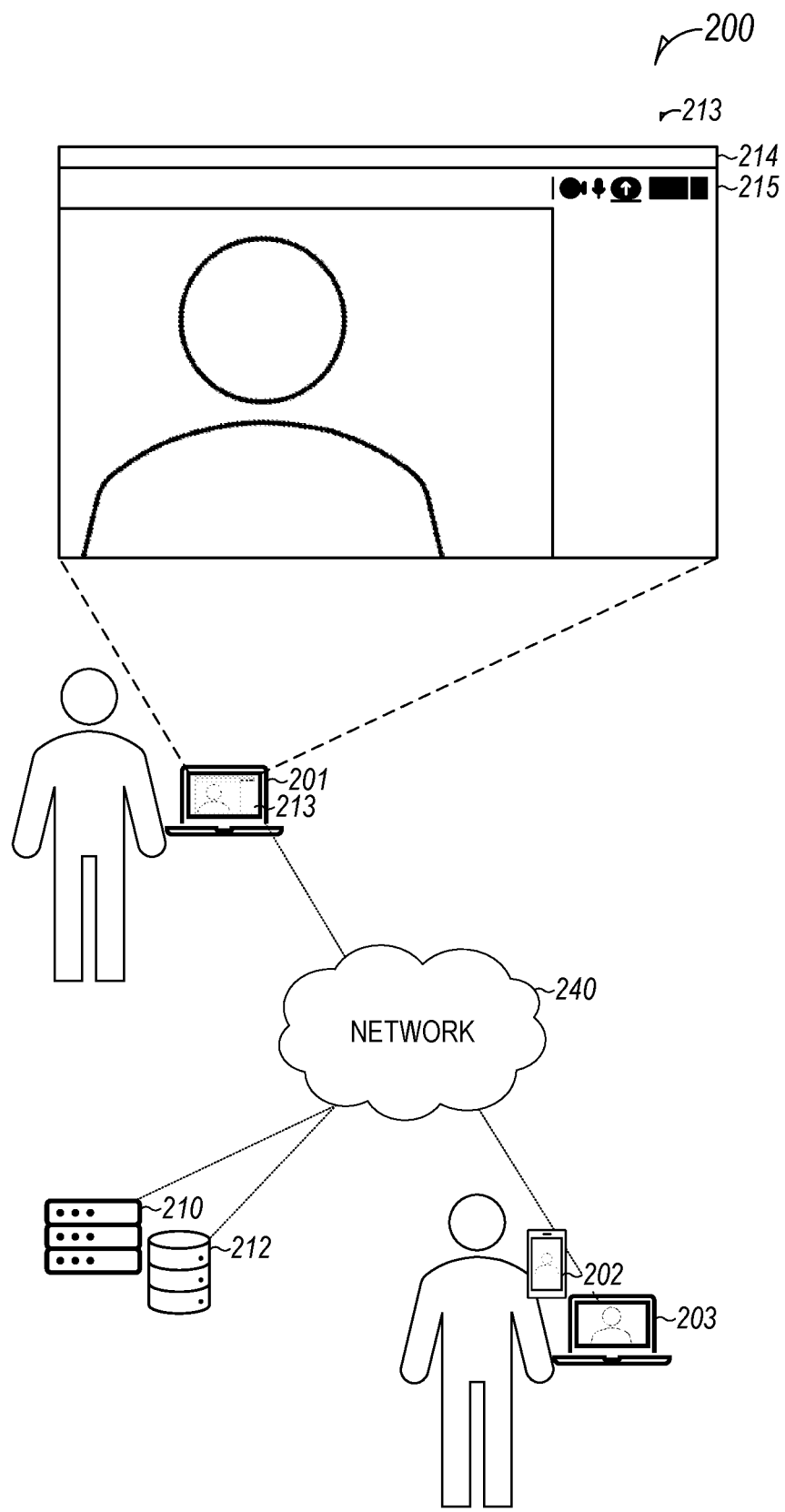
FIG. 2 illustrates an example unified communication session between a first participant and one or more second participants.

FIG. 2 illustrates an example unified communication session 200 between multiple users having respective user devices (e.g., a first device 201, a second device 202, a third device 203, etc.) executing meeting applications coupled to a media service 210 (e.g., as through a connection to a network 240, over the internet, etc.) configured to manage the unified communication session 200, such as through one or more devices, servers, or other computing components of or associated with the media service 210, such as a database 212, etc.

A first participant (e.g., a presenter) of the unified communication session 200 can be configured to share information with one or more second participants (e.g., an audience) of the unified communication session 200. Shared information can include, in different examples, representations of one or more participants of the unified communication session 200 in various combinations or configurations (e.g., such as captured through a camera of or coupled to the first device 201), a video stream of an active screen or a portion of an active screen of the first device 201 (e.g., screen sharing), one or more applications executed on the first device 201 (e.g., application or window sharing), or combinations thereof.

The first device 201 includes a view of a meeting application 213 (e.g., an application window) of the first participant. The meeting application 213 includes a title bar 214 optionally including one or more control buttons (e.g., minimize, maximize, close, etc.) and a main area 215 including a control bar having one or more selectable controls. The one or more selectable controls can include, in certain examples, control buttons for one or more actions of the unified communication session 200, such as a camera button to control access to a camera of or coupled to the first device 201, a microphone button to control access to a microphone (e.g., mute, unmute) of or coupled to the first device 201, a share button configured to trigger selection of one or more share options for the first participant, a leave button configured to leave or end the unified communication session 200, a participants button to provide a roster of participants of the unified communication session 200, a conversation button to control presentation of a message thread of the unified communication session 200, one or more other control buttons, or combinations thereof.

Recording of the unified communication session 200 can be controlled using one or more settings of the meeting application 213. Recorded unified communication sessions 200 can be uploaded over the network 240 to the media service 210 for subsequent processing, distribution, etc. In certain examples, a unified communication session 200 can be recorded and upload can be delayed to a later time, such as depending on a status of the device managing or recording the unified communication session (e.g., a status of a data connection, a power status, such as if the device is operating on battery or wall power, a battery status, etc.).

In other examples, a media file container can be uploaded to the media service 210, such as from one or more of the first, second, or third devices 201, 202, 203, for storage, processing, or distribution to one or more users. For example, the user of the second device 202 (e.g., a mobile phone executing the meeting application) can select a video file from the second device 202 to upload and share with other users of the unified communication session 200, etc. The media service 210 can receive the request for upload and provide a response with instructions to the meeting application executed on the second device 202. The instructions can include one or more upload rules to direct how the media file container is uploaded to the media service 210. The meeting application can manage upload of the selected video file as a media file container from the second device 202 to the media service 210, according to the received instructions or upload rules.

In certain examples, the media service 210 has access to certain information about connected devices, such as through respective meeting applications installed on or running on the respective devices. For example, the media service 210 can access what version of the meeting application is running on the respective device, certain information about the hardware or codec installed on the respective device (e.g., associated with the operating system of the respective device, or requirements of install on the version of the meeting application, such as stored in the database 212, included in the request, etc.). In turn, the media service 210 can provide one or more instructions as upload rules to the respective devices (e.g., the first device 201, the second device 202, the third device 203, etc.) to perform one or more operations prior to uploading the media file container to the media service 210, depending on the information about the meeting application or the device executing the meeting application, etc., such as described herein. For example, the instructions can be different if the respective device is running a mobile version of the meeting application, such as executed on a respective device with an Android operating system, etc., versus a desktop version of the meeting application executed on a respective device with a Windows 11 operating system, etc. If the information about the respective device indicates that the device has additional processing capabilities or resources, the media service 210 can provide instructions to perform more operations at the respective device, offloading downstream operations of the media service 210. Such instructions can be received and stored by the respective devices, such as by protocols of the meeting applications executed on the respective devices, etc.

Figure 3:
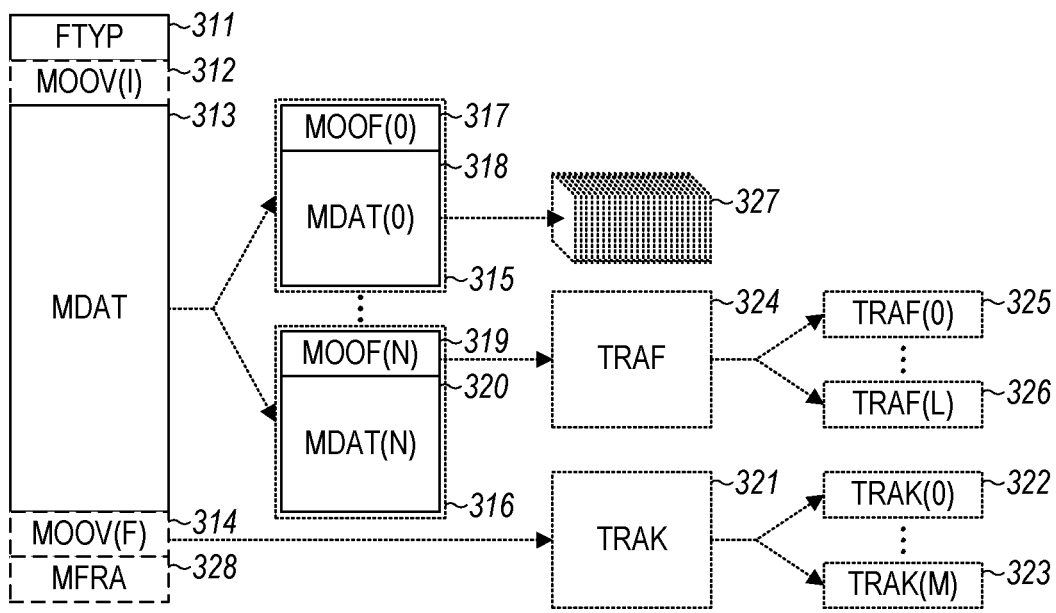
FIG. 3 illustrates an example media file container.

FIG. 3 illustrates an example media file container 300 (e.g., a digital multimedia container format, such as an MPEG container, an MP4 container, a fragmented MP4 (FMP4) container, etc.) organized in a number of boxes (or "atoms"), such as described by various International Organization for Standardization and the International Electrotechnical Commission (IOS/IEC) specifications, ISO/IEC 14496-14:2020 (the "MPEG-4 Part 14 Specification"), etc. In an example, the meeting application described herein can be configured to package, read, encode, transcode, decode, unpack, extract, repackage, etc. information in the media file container 300.

The media file container 300 includes an initial file type (FTYP) box 311, a media data box (MDAT) box 313, and associated metadata (MOOV) box, illustrated herein as an initial MOOV (MOOV(I)) box 312 or a final MOOV (MOOV(F)) box 314. The FTYP box 311 includes file type and compatibility information of the media file container 300. The MDAT box 313 includes individual frames of media data (e.g., frames 327), such as video data, audio data, image data, or other media data, etc., often fragmented in an interleaved order, although sometimes in separate portions, such as successive portions (e.g., video then audio, etc.), etc. The MOOV box (e.g., the MOOV(I) box 312 or the MOOV (F) box 314) includes metadata of the media data in the MDAT box 313, including a duration, timescale, bitrate, width, height, coding information, pointers, keyframes, etc., often required by a media player to play the media file in the MDAT box 313, as well as the specific location or offset of specific frames, etc.

The information reflected in the MOOV box (or sub-boxes of the MOOV box) is often not fully known until the media data has finished recording or been encoded, etc. Accordingly, the MOOV box is often placed after the MDAT box 313 in the media file container 300 (e.g., the MOOV(F) box 314. Information in the MOOV box is often required by a media player to play the media data in the MDAT box 313. If placed near the end of the media file container 300, a majority of the media file container 300 (e.g., all media data and metadata of the media data) must be downloaded or received before the media data can be played by the media player. In other examples, the MOOV box can be placed before the media the MDAT box 313 in the media file container (e.g., the MOOV(I)) box 312). The media file container 300 generally includes one of the initial MOOV(I) box 312 or the final MOOV(F) box 314, but not both.

The aggregate media data in the media file container 300 can be quite large. For example, one hour of H.264 encoded video data at high definition (e.g., 4 k resolution) can be about 1.8 GB of video data. Upload services frequently have size limitations (e.g., 100 MB, 200 MB, etc.). While in certain examples the MDAT box 313 can include all of the media data of the media file container 300 in a single box, in other examples, the media file container 300 or the MDAT box 313 can be fragmented into a number of smaller pieces.

In an example, the MDAT box 313 can be fragmented into N pieces (e.g., from [0:N]), including a first fragment (FRAGMENT(0)) 315, a second fragment (FRAGMENT (N)) 316, and any intervening segments, etc. Each fragment can include an associated MDAT box (e.g., a first fragment MDAT(0) box 318, a second fragment MDAT(N) box 320, and any intervening fragment MDAT boxes, etc.) and a fragment metadata (MOOF) box for the respective fragment (e.g., a first fragment MOOF(0) box 317, a second fragment MOOF(N) box 319, and any intervening fragment MOOF boxes, etc.). Breaking the MDAT box 313 into smaller fragments allows relatively larger media files to be streamed or played before a majority of the media file container 300 is downloaded, received, or in certain examples, before the complete media file has finished recording.

In other examples, the media file container 300 includes other boxes, such as a movie fragment random access (MFRA) box 328 (an index that enables seeking within the media file container 300 or among fragments), etc. Additionally, the MOOV box or the fragment MOOF box can include one or more sub-boxes in the body of the respective MOOV box or fragment MOOF box, such as one or more track boxes (e.g., TRAK or TRAF, respectively, etc.), etc.

The MOOV box can include metadata for one or more tracks of media data, each track including one or more frames of media data, etc., stored in the MDAT box 313 or an associated fragment. For example, the MOOV(F) box 314 can include a single track (TRAK) box 321 including metadata for one or more frames of media data of the MDAT box 313 or the associated fragment, including the location in the MDAT box of the data associated with individual frames, frame rate, size, codec, etc. Alternatively, the MOOV(F) box 314 can include a number of tracks (e.g., between [0:M], such as a first track TRAK(0) box 322, a second track TRAK(M) box 323, and any intervening TRAK boxes, etc.). In an example, the first track TRAK(0) box 322 can include metadata for video data of the MDAT box 313, and the second track TRAK(M) box 323 can include metadata for audio data of the MDAT box 313 corresponding to the video data of the MDAT box 313. Although illustrated with respect to the MOOV(F) box 314, such description is equally applicable to the optional MOOV(I) box 312.

Similarly, a MOOF box (e.g., the MOOF(0) box 317, etc.) can include metadata for one or more tracks of media data, each track including one or more frames (e.g., frames 327) of media data stored in an associated fragmented MDAT box (e.g., MDAT(0) box 318, etc.). For example, the second fragment MOOF(N) box 319 can include a single track (TRAF) box 324 including metadata for one or more frames (e.g., frames 327) of media data of the respective fragment.

Alternatively, the second fragment MOOF(N) box 319 can include a number of tracks (e.g., between [0:L]), such as a first fragmented TRAF(0) box 325, a second fragmented TRAF(L) box 326, and any intervening TRAF boxes, etc.). In an example, the first fragmented TRAF(0) box 325 can include metadata for video data of the MDAT(N) box 320, and the second fragmented TRAF(L) box 326 can include metadata for audio data of the MDAT(N) box 320 corresponding to the video data of the MDAT(N) box 320. Although illustrated with respect to the MOOF(N) box 319, such description is applicable to any of the MOOF boxes (e.g., the MOOF(0) box 317, etc.).

The media file container 300 can include audio and video tracks interleaved in an individual MDAT box (e.g., an MDAT box having interleaved video and audio in separate tracks, etc.). In other examples, the media file container 300 can include one or more fragmented MDAT boxes containing only video data (in one or more tracks) followed by or preceding one or more separate fragmented MDAT boxes containing only audio data (in one or more tracks), etc.

Each box (or atom) in the media file container is organized in a specific way (e.g., according to various specifications, such as the MPEG-4 Part 14 Specification, etc.), each including a header having a certain number of bytes (e.g., 8 bytes, etc.) and a data field (e.g., the remaining bytes of the box subsequent to the header). The header has an initial first number of bytes (e.g., 4 bytes) defining the size of the box, and a second number of bytes (e.g., 4 bytes), subsequent to the first number of bytes, defining the type or name of the box. Parsing the header of a first box will define the location of the header of a subsequent, second box, etc., as well as specific information about the data stored in the remaining portion of the box subsequent to the header, which can include but is not limited to the following: video frames, audio samples, interleaving av data, captioning data, chapter index, title, poster, user data, various technical metadata (e.g., codec, timescale, version, preferred playback rate, preferred playback volume, movie duration, etc.), etc.

Parsing a first box (e.g., in hexadecimal) in the media file container 300 (e.g., the FTYP box 311), according to the MPEG-4 Part 14 Specification, can provide the following: in the first four bytes (as an unsigned integer), a size of the box; and in the second four bytes, a name or type of the box.

For example, if the first four bytes identifies a box size of 32 bytes, and the second 4 bytes indicates that the name or type of the box is FTYP, the MPEG-4 Part 14 Specification indicates that: the third four bytes identifies a major brand of the of the container; the fourth four bytes identifies a minor version of the container; and the remaining 16 bytes (of the 32 byte size box) identifies compatible brands of the container. Whereas a size of the MDAT box 313 depends on the type, duration, and resolution of the associated media data and the number of fragments, commonly ranging in size between hundreds of KB to MB to even GB of data, a size of the associated MOOV box is comparatively small, often tens of KB or less, depending on the media information in the media file container 300. In one example, an MDAT box having more than 1 GB of media data can have an associated MOOV box of 6 KB. Once a header is located and the size and type are determined, the subsequent header can be located in the 8 bytes following previous box.

Parsing a subsequent header can identify the subsequent box, for example, the MOOV(I) box 312 or the MDAT box 313, etc., each including information according to the corresponding specification (e.g., the MPEG-4 Part 14 Specification, etc.).

The metadata or track boxes (e.g., the MOOV and/or MOOF boxes, the TRAK and/or TRAF boxes, etc.) of the media file container 300 can include information about the media data of the one or more MDAT boxes of the media file container 300, including location, description, and specific information about tracks, frames, dimensions, timescale, duration, sampling rate, volume, etc. Parsing the specific metadata or track boxes can identify the location of specific frames, samples, audio tracks, video tracks, etc., of the media data information.

The information from the metadata or track boxes can be used to identify and assemble, among other things, specific frames of the media information, such as representative images (e.g., still pictures) of a video of the media file container 300, representative audio or video segments of the video or audio of the media file container 300, etc. In other examples, the information from the metadata or track boxes can be used to identify and create a new media file container having only specific portions of the media file container 300, such as a second media file container having only the audio data of the media file container 300 (in one or more tracks), etc.

In an example, a first media file container can include H.264 encoded video data at about 1.8 GB per hour of high definition (e.g., 4 k) video and AAC encoded audio data at about 90 KB per hour corresponding to the H.264 encoded HD video. An associated MOOV box for such one hour H.264 encoded high definition video with ACC encoded audio can be single-digit KBs or less. To begin downstream transcription processes for the first media file container, 100 KB of a nearly 2 GB file is required, a small fraction of the total file size. In certain examples, for devices on battery power or connected to the media service using cellular data or a metered network, it can be beneficial to only provide the MOOV box and the audio data, while queueing the media file container until the device is plugged into wall power or connected to a wireless (e.g., non-cellular) or unmetered network. In other examples, one or more other encoding techniques or bitrates can be used, impacting the data per second/minute/hour requirements of the system.

Figure 4:
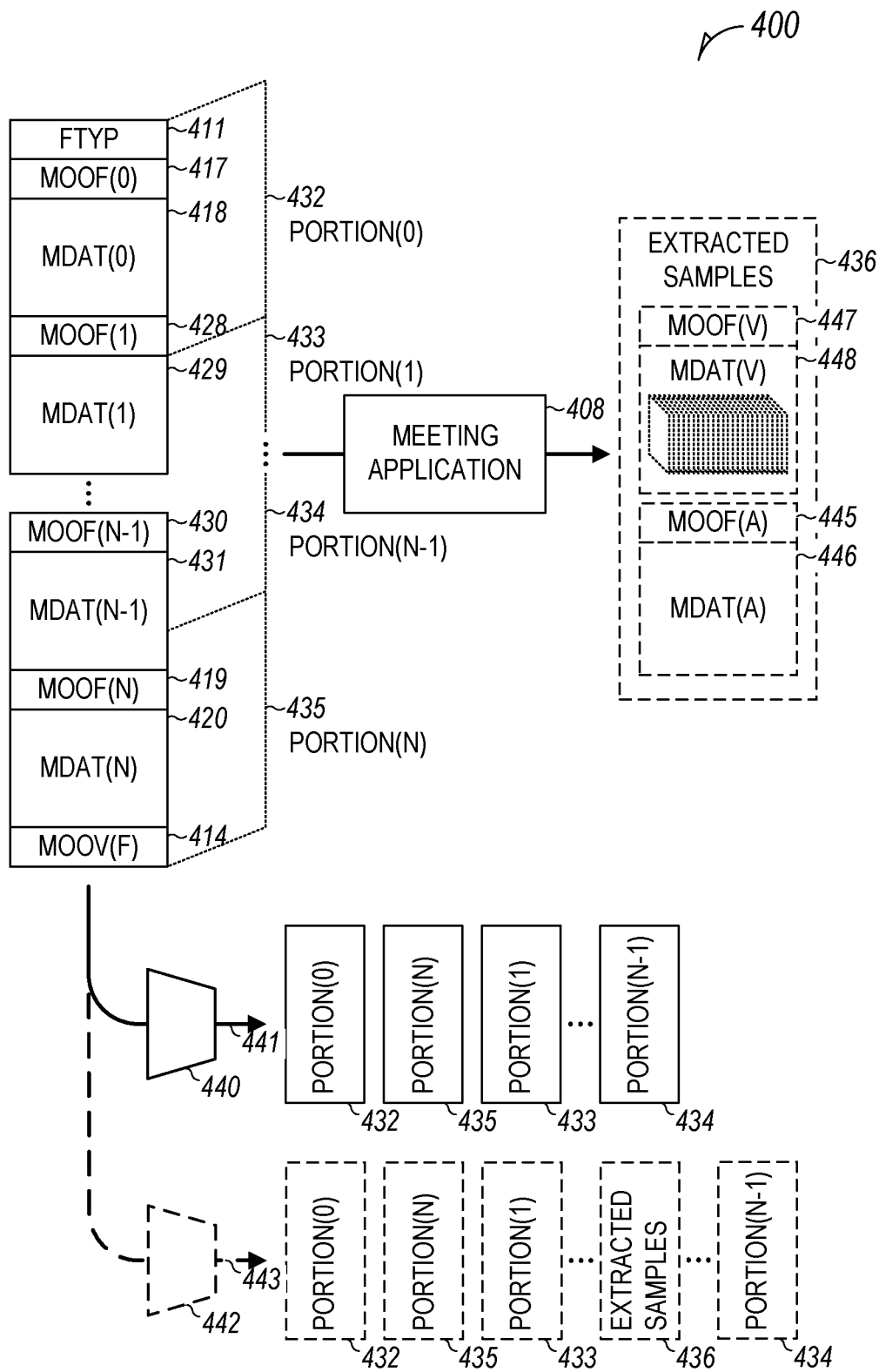
FIG. 4 illustrates an example media file container divided into separate portions.

FIG. 4 illustrates an example media file container 400 divided into separate portions (e.g., PORTION[0:N]), such as for transport or upload from a first device to a second device. The separate portions can include a first portion (PORTION(0)) 432, a second portion (PORTION(1)) 433, a third portion (PORTION(N-1)) 434, a last portion (PORTION(N)) 435, and any intervening portions between the second portion (PORTION(1)) 433 and the third portion (PORTION(N-1)) 434. In an example, a meeting application 408 can be configured to read, transcode, divide, package, repackage, or otherwise manipulate the media file container 400 or the media data in the media file container 400.

The media file container 400 includes an FTYP box 411, a number of fragment MOOF boxes and corresponding fragment MDAT boxes (e.g., a first MOOF(0) box 417, a first MDAT(0) box 418, a second MOOF(1) box 428, a second MDAT(1) box 429, a third MOOF(N-1) box 430, a third MDAT(N-1) box 431, a last MOOF(N) box 419, a last MDAT(N) box 420, and any intervening MOOF or MDAT boxes, etc.), and a final MOOV(F) box 414.

In certain examples, the size of the first and last portions, PORTION(0) 432 and PORTION(N) 435, can be fixed byte ranges (e.g., 1 MB, 4 MB, etc.) of the media file container 400. The fixed byte range can be sized to capture the MOOV box regardless of whether the MOOV box is placed before or after the MDAT box or boxes in the media file container 400. The diversity of devices and device capabilities performing such upload varies greatly, from mobile phones to netbooks to laptop computers to desktop computers with sophisticated GPUs. Sending the first and last fixed portions of the media file container 400 can enable the second device to receive the information it needs to schedule and plan downstream processes without unnecessarily exhausting the capabilities of the variety of first devices, when such limited resources of such devices may be relied upon for other purposes (e.g., a cell phone with limited battery life or data used to navigate home, etc.).

In an example, the first device can include a MUX device 440, such as a component of or available to the meeting application 408, or one or more processing or computing components configured to prepare the separate portions of the media file container 400 for transport or upload, including adding a transport header to the individual portions, shifting the order of portions for transport or upload, requiring that the first and last portions are transported or uploaded prior to the intervening portions, and outputting a transport stream 441 for upload to the second device. In certain examples, the fixed byte ranges can be approximate and can include the subsequent transport header applied by the MUX device 440 or one or more other processing or computing components. For example, a 4 MB fixed byte range of the media file container 400 can include the size of the respective portion after adding the relevant transport header.

Although the separate portions (PORTION[0:N]) 432-435 are illustrated in FIG. 4 as relatively large separate chunks of the media file container 400, in certain examples, the separate portions can include groups of relatively smaller individual packets (e.g., transport packets), where the separate portions of the media file container 400 require a number of smaller packets (e.g., the first portion 432 can include a number of transport packets, each having an associated transport header, etc.).

In other examples, the size of the first and last portions (PORTION(0) 432 and PORTION(N) 435) can be fixed byte ranges, but different from each other, such as to take into account standard information before and after the MDAT box or boxes in the media file container 400. For example, a MOOV box before the MDAT box or boxes often follows the FTYP box at the beginning of the media file container 400. In contrast, a number of different boxes can be included after the MDAT box or boxes, depending on the type of media data in the media file container 400 and any associated data (e.g., samples, index images, user data, etc.), with the MOOV box typically following the MDAT box or boxes but before the remaining number of different boxes. Accordingly, the first portion can be a first range (e.g., 1 MB, 100 KB, etc.), and the last portion can be a different, larger range (e.g., 4 MB, 1 MB, etc.) to account for such variances. Such byte ranges are in contrast to the size of the media file container 400 itself, which, as illustrated above, can commonly exceed 1 GB.

To upload the media file container 400, the first device (e.g., a meeting application executed on the first device, etc.) can provide a request to upload a file to the second device (e.g., a meeting service, etc.) or to otherwise create an upload session between the first and second devices. The request (e.g., an HTTP request, etc.) can include a certain combination of parameters and headers, and in certain examples, a first portion or chunk of the file to be uploaded. The second device can receive the upload request and provide a response including information about where to provide the remainder of any requests as part of the upload session (e.g., details to establish or continue the upload session, etc.).

The transport stream 441 from the MUX device 440 in FIG. 4 has a transport stream order of: the first portion (PORTION(0)) 432, the last portion (PORTION(N)) 435, the second portion (PORTION(1)) 433 (followed by any intervening portions), then the third portion (PORTION(N-1)) 434. In other examples, the order of the first and last portions can be switched, so long as the first and last portions (PORTION(0) and PORTION(N)) of the media file container 400 are transmitted before the remainder of the intervening portions (e.g., PORTION[1:N-1]).

In an optional example, a second MUX device 442 can place extracted samples 436 in a second transport stream 443, such as to provide information processed at the first device (e.g., the extracted samples 436), in certain examples, after starting the upload of the media file container 400 to the second device. Although illustrated as between the second portion (PORTION(1)) 433 and the third portion (PORTION (N-1)) 434 in the second transport stream 443, the information processed by the first device For example, the first device can identify audio data (e.g., audio frames) from the media file container 400 and package the identified audio data into an audio byte stream separate from the video data in the MDAT box or boxes in the media file container 400, in certain examples, including a container file including a MOOF(A) box 445 (or a MOOV box) and an associated MDAT(A) box 446. In other examples, the first device can identify sample frames of from the media file container 400 and package the identified sample frames (e.g., as representative images of the video data, thumbnail images, etc.), in certain examples in a container file including a MOOF(V) box 447 (or a MOOV box) and an associated MDAT(V) box 448. The first device can upload the extracted samples 436 before, during, or separate from upload of the media file container 400.

In certain examples, the first device can delay upload of the media file container 400 until the extracted audio frames or sample video frames are packaged and separately sent as a separate container file to the second device, or the first device can repackage the media file container 400 to include the extracted audio frames or sample video frames, and then upload the repackaged media file container to the second device.

In an example, the first device can repackage the extracted audio frames or sample video frames as one or more extracted samples (e.g., the extracted sample 436), placing the extracted samples 436 before the video data in the repackaged media file container, such that upload of the repackaged media file container will provide the extracted audio frames or sample video frames to the second device before the video data of the media file container 400.

In other examples, the first device can upload the first and last portions (PORTION(0) 432 and PORTION(N) 435) of the media file container 400 to the second device, then upload the extracted samples 436 as one or more separate container files, before resuming upload of the remaining portions of the media file container 400 (e.g., PORTION[1: N-1]). In other examples, the first device can begin upload of the media file container 400, and insert the extracted samples 436 into the second transport stream 443 (also used to upload the media file container 400) as they are packaged and ready to send. In other examples, upload of the media file container 400 can be delayed until the extracted samples 436 are packaged and uploaded, or the media file container 400 can be repackaged to include the extracted samples 436, such as before the video data in the repackaged media file container 400.

Figure 5:
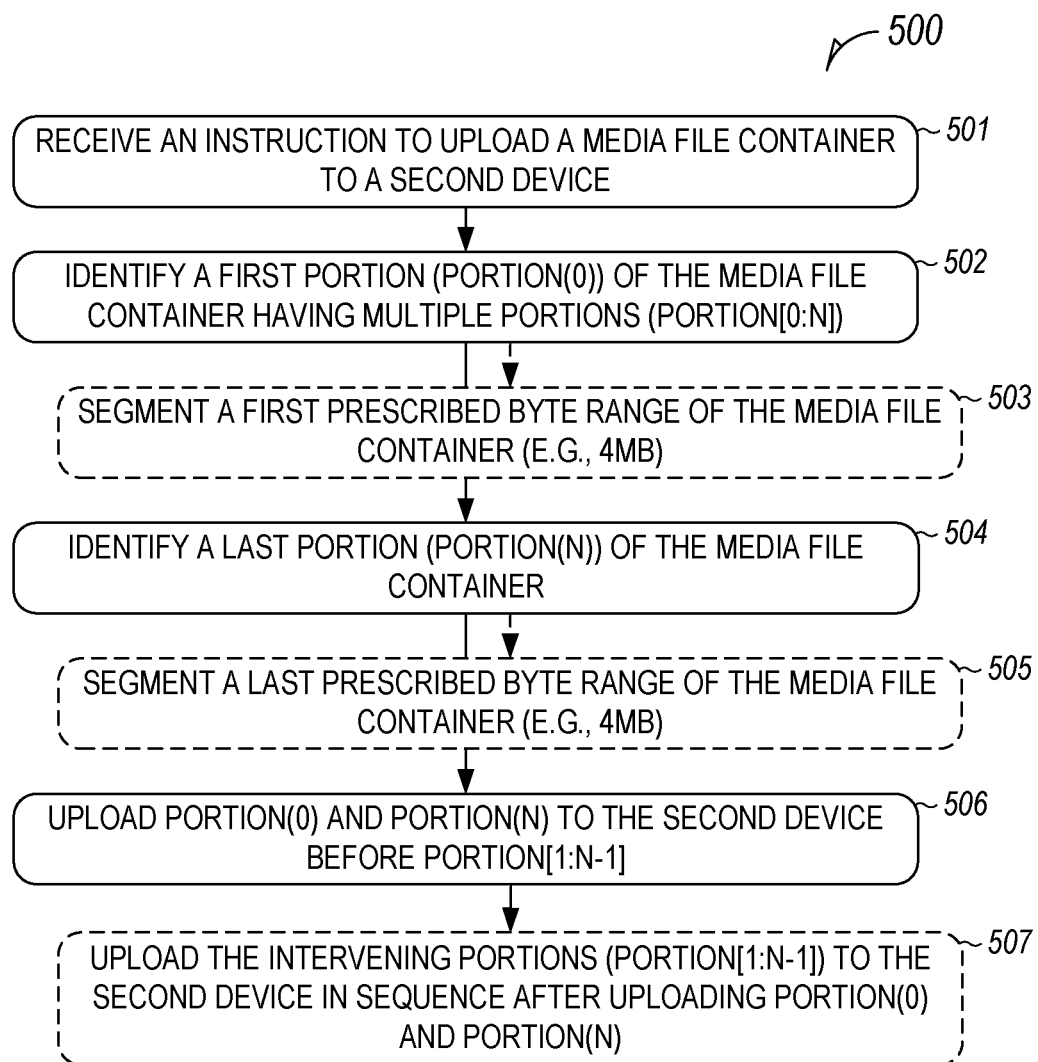
FIG. 5 illustrates an example method of uploading a media file container from a first device to a second device.

FIG. 5 illustrates an example method 500 of uploading a media file container from a first device, such as using a meeting application executed on the first device, to a second device configured to process media data in the media file container.

At step 501, an instruction to upload the media file container to the second device can be received, such as by a user of the first device interacting with the meeting application executed on the first device through one or more I/O components of the first device, or one or more other actions, activities, or commands. In response, the first device can perform a series of instructions according to a set of upload rules. The upload rules, in certain examples, can be stored on the first device, such as by a meeting application executed on the first device, etc.

In an example, the instruction to upload the media file container can include a separate selection and upload of a media file or a media file container by a user, such as through the meeting application. In other examples, the instruction to upload the media file container can include ending a recorded unified communication session on the first device, with one or more settings of the meeting application executing the unified communication session triggering upload of the recorded unified communication session after the unified communication session ends. In certain examples, the meeting application can immediately provide an upload request to the second device. In other examples, the meeting application can delay the upload request to occur in a certain time window (e.g., after working hours) or with respect to various power, processing, or network status of the first device, etc. For example, the upload can be delayed until the first device is connected to wall power, until the first device is connected to a non-cellular (e.g., Wi-Fi, etc.) data source, etc.

At step 502, a first portion (e.g., PORTION(0)) of the media file container can be identified or segmented for upload to the second device. The size of different media file containers can vary greatly depending on, among other things, the media data contained therein. The media file container can be partitioned or segmented into a number of portions, for example in sequence between [0:N] (e.g., PORTION[0:N]). The first portion (e.g., PORTION(0)) includes a beginning portion of the media file container, including a first range of bytes of the media file container. For example, in a 1 GB media file container, the first portion (e.g., PORTION(0)) can include a first number of bytes, for example, from byte 0 to byte X, where the remainder of the bytes of the media file container range between byte X and the last byte, byte 1 GB. For example, at optional step 503, a first prescribed byte range of the media file container (e.g., 4 MB, 1 MB, etc.) can be segmented from the media file container and defined as the first portion (e.g., PORTION (0)).

At step 504, a last portion (e.g., PORTION(N)) of the media file container can be identified or segmented for upload to the second device. The last portion includes a concluding portion of the media file container, including a last range of bytes of the media file container. For example, in a 1 GB media file container, where the first portion includes a first number of bytes, for example, from byte 0 to byte X, the last portion can include a last number of bytes (the same as or different number of bytes as the first portion of bytes of the first portion) ranging between byte Y (where Y is equal to or greater than X) and the last byte, byte 1 GB. For example, at optional step 505, a last prescribed byte range of the media file container (e.g., 4 MB, 1 MB, etc.) can be segmented from the media file container and defined as the last portion.

At step 506, the first portion (e.g., PORTION(0)) of the media file container and the last portion (e.g., PORTION(N)) of the media file container are uploaded before the intervening portions (e.g., PORTION[1:N−1]) of the media file container. In an example, the first portion of the media file container can be uploaded before the last portion of the media file container, such that the order of upload is the first portion, the last portion, then the second portion (e.g., PORTION(1)), and so on, until the third portion (e.g., PORTION(N−1)). In other examples, the last portion of the media file container can be uploaded before the first portion.

In an example, uploading the first and last portions of the media file container can include creating a schedule for uploading the first and last portions of the media file container before the intervening portions of the media file container between the first and last portions and based on the created schedule, completing uploading of the first and last portions of the media file container before completing uploading of the intervening portions of the media file container.

At optional step 507, after the first and last portions (e.g., PORTION(0) and (PORTION(N)) of the media file container are uploaded to the second device, the remaining intervening portions (e.g., PORTION[1:N−1]) of the media file container can be uploaded to the second device, in sequence. After receiving all portions of the media file container, the second device can reassemble the media file container in order from the first portion in sequence to the last portion (e.g., PORTION[0:N]) for subsequent use, processing, distribution, etc.

Figure 6:
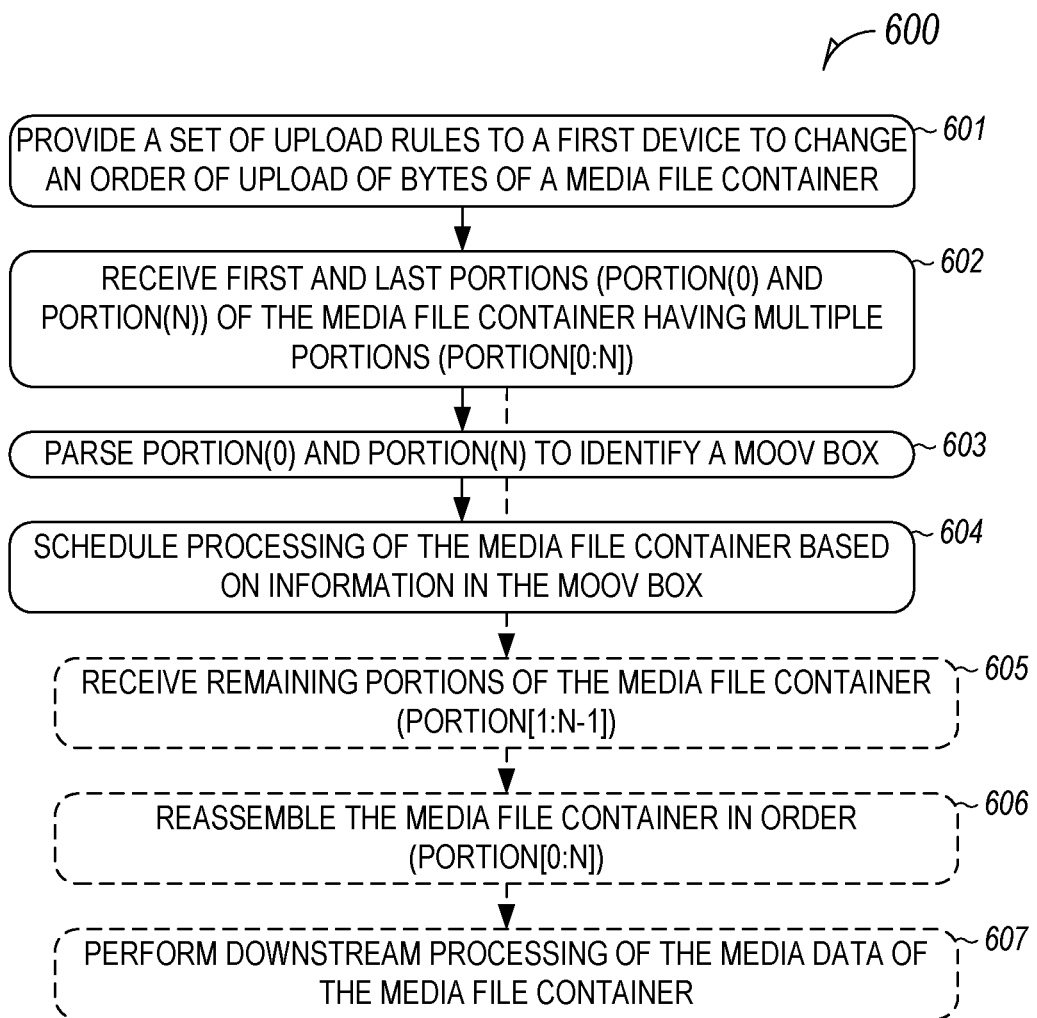
FIG. 6 illustrates an example method of processing media data in a received media file container.

FIG. 6 illustrates an example method 600 of receiving a media file container at a second device from a first device and processing media data in the media file container, such as in response to a request to upload the media file container from the first device. Responsive to receiving the request to upload the media file container from the first device, the second device can provide a response to the first device including instructions or one or more upload rules for the first device, for example, using a meeting application executed on the second device, etc.

At step 601, a set of upload rules can be provided from the second device to the first device to change a normal order of upload of bytes of a media file container, transitioning from normal upload operation to a modified upload operation. In an example, the second device can provide the set of upload rules to a meeting application executed on the first device, such as in response to a request to upload a particular media file container, or an upload operation triggered by one or more activities or actions with respect to the meeting application, such as ending a meeting recording, etc. In certain examples, the second device can include or be a portion of a meeting service connected to the meeting application of the first device. In certain examples, a media service can include the meeting service, or vice versa.

In certain examples, the second device can delay upload of the media file container from the first device depending on, among other things, a queue of downstream processing operations pending at the second device. The second device can determine the one or more upload rules depending on the processing queue at the second device, the version of the meeting application executed on the first device, an operating system of the first device or one or more other processing resources or capabilities of the first device (e.g., determined at install of the meeting application, etc.), the connection between the first and second devices, a power status of the first device, etc.

At step 602, portions of the media file container having multiple portions (e.g., PORTION[0:N]) can be received at the second device, such as first and last portions (e.g., PORTION(0) and PORTION(N)) of the media file container. The last portion of the media file container can be received at the second device directly subsequent to the first portion, before intervening portions (e.g., PORTION[1:N−1]) of the media file container.

At step 603, the received first and last portions (e.g., PORTION(0) and PORTION(N)) of the media file container can be parsed, searched, or read to identify a MOOV box in one of the first or last portions. As described above, each box in the media file container includes a header having a certain number of bytes (e.g., typically 8 bytes), with the first four bytes of the header defining the size of the box and the next four bytes of the header defining the type or name of the box. The bytes of the received first and last portions of the media file container can be searched to identify the name of type or name of the box as "MOOV" (e.g., as a string). Once the string "MOOV" is identified in the received first and last portions of the media file container, the previous 4 bytes can identify the size of the MOOV box, and the remaining bytes of the MOOV box can be read, including information about the media data in the media file container (e.g., type, tracks, size, dimensions, duration, codec, scale, etc.).

At step 604, processing of the media file container can be scheduled based on the information in the MOOV box, before the full media file container is received. The information in the MOOV box can identify the type of media data in the media file container, its duration and encoding, the location of specific types of media data in the media file container, etc. For example, the information in the MOOV box can identify whether the media file container includes audio data, and if so, whether the audio data is interleaved with video data or separated, such as in a separate MDAT box, etc. In other examples, the information in the MOOV box can determine whether the media file container includes video data, and if so, whether or not summary images of the video data have been created and included in the media file container.

At step 605, the remainder of the multiple portions (e.g., PORTION[1:N−1]) of the media file container can be received, after receiving the first and last portions (e.g., PORTION(0) and PORTION(N)) of the media file container. At step 606, the received portions (e.g., PORTION[0:N]) of the media file container can be reassembled in order from the first portion of the media file container sequentially to the last portion of the media file container. At step 607, downstream processing of the media data of the media file container can be performed, such as according to the scheduled processing, including one or more of transcription, closed captioning, encoding in different bitrates, and preparing preview thumbnails at regular intervals through the media data of the media file container, etc.

Figure 7:
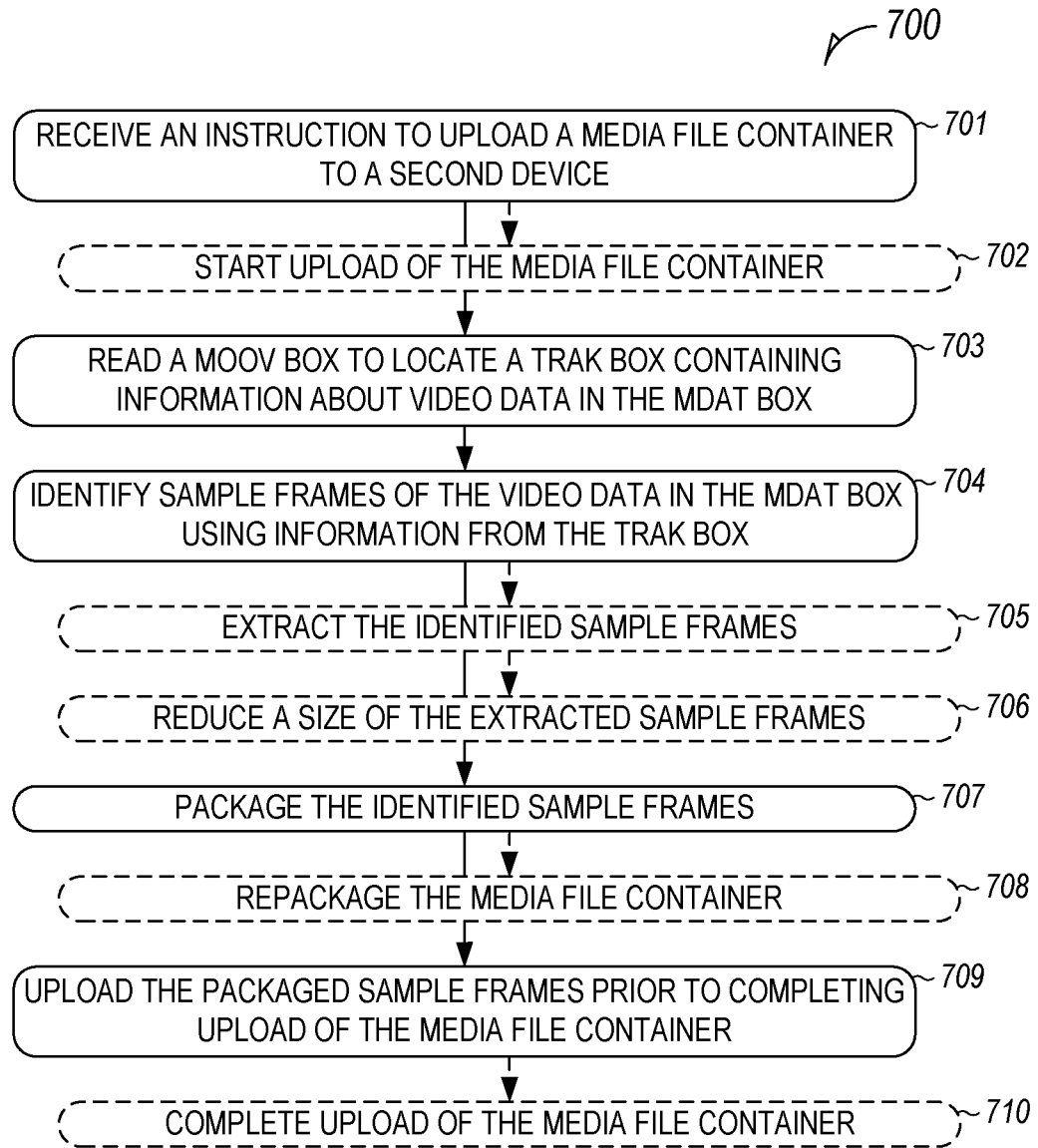
FIG. 7 illustrates an example method of identifying, packaging, and uploading sample frames from video data of a media file container from a first device to a second device to improve downstream processes of the second device.

FIG. 7 illustrates an example method 700 of uploading a media file container from a first device, such as using a meeting application executed on the first device, to a second device configured to process or distribute the media file container.

At step 701, an instruction to upload the media file container to the second device can be received, such as by a user of the first device interacting with the meeting application executed on the first device through one or more I/O components of the first device, or one or more other actions, activities, or commands. In response, the first device can perform a series of instructions according to a set of upload rules. The upload rules, in certain examples, can be stored on the first device, such as by a meeting application executed on the first device, etc.

At step 702, upload of the media file container, such as from the first device to the second device, can optionally start. In an example, the first device can provide an upload request to the second device, such as through the meeting application executed on the first device, etc. In other examples, the upload request, and accordingly, the upload, can be delayed until additional processing of the media file container is performed by the first device, or for one or more other reasons (e.g., to occur in a certain time window or with respect to various power, processing, or network status of the first device, etc.), such as described herein.

At step 703, the first device (e.g., the meeting application, etc.) can read a metadata (MOOV) box of the media file container to locate a track (TRAK) box (or TRAF box) containing information about video data in a media data (MDAT) box. At step 704, sample frames of the video data in the MDAT box can be identified using information from the TRAK box (e.g., such as a frame rate, time scale, or offset of a specific frame of media data in the MDAT box, etc.).

In certain examples, identifying the sample frames can include identifying a frame (e.g., an image) of the video data at regular intervals throughout the duration of the video data. For example, a sample frame can be identified every 120 seconds throughout the duration of the video data. In other examples, the interval between successive sample frames can depend on the duration of the video data. For example, if the video data includes a video having a duration of 60 minutes, a sample frame can be identified at a set duration of the video data, such as at successive 10% (or one or more other percentages) intervals of the duration of the video data. In such example, a sample frame can be identified every 6 minutes in duration of the video data. In other examples, a sample frame can be selected, such as by applying a filter (e.g., by the meeting application, etc.) to a range of frames about a regular interval to determine a substantial (e.g., 40%) pixel difference from a successive frame or a previous sample frame.

At step 705, the identified sample frames can be optionally extracted or copied from the MDAT box, such as for packaging in a new file, box, or media file container. At step 706, the size of the extracted sample frames can be optionally reduced (e.g., creating thumbnail images, etc.), such as by down sampling or by one or more other operation, to reduce the size of the extracted sample frames.

At step 707, the identified sample frames can be packaged, such as into a new file, box, or media file container. At 708, the first device can optionally repackage the media file container to include the identified sample frames. In other examples, the first device can create a new track box or a MOOV or MOOF box to identify the location of the selected sample frames, without extracting the sample frames from the media file container or otherwise placing the media data associated with the identified sample frames into a separate file, box, or media file container.

At step 709, the packaged sample frames can be uploaded by the first device to the second device, in certain examples, prior to completing upload of the media file container started at optional step 702, etc. In other examples, the packaged sample frames can be uploaded before starting upload of the media file container. In other examples, the packaged sample frames can be inserted (e.g., multiplexed) into a transport stream between portions of the media file container, before the media file container is completely uploaded by the transport stream. At step 710, upload of the media file container is optionally completed after any or all of steps 701-709.

Figure 8:
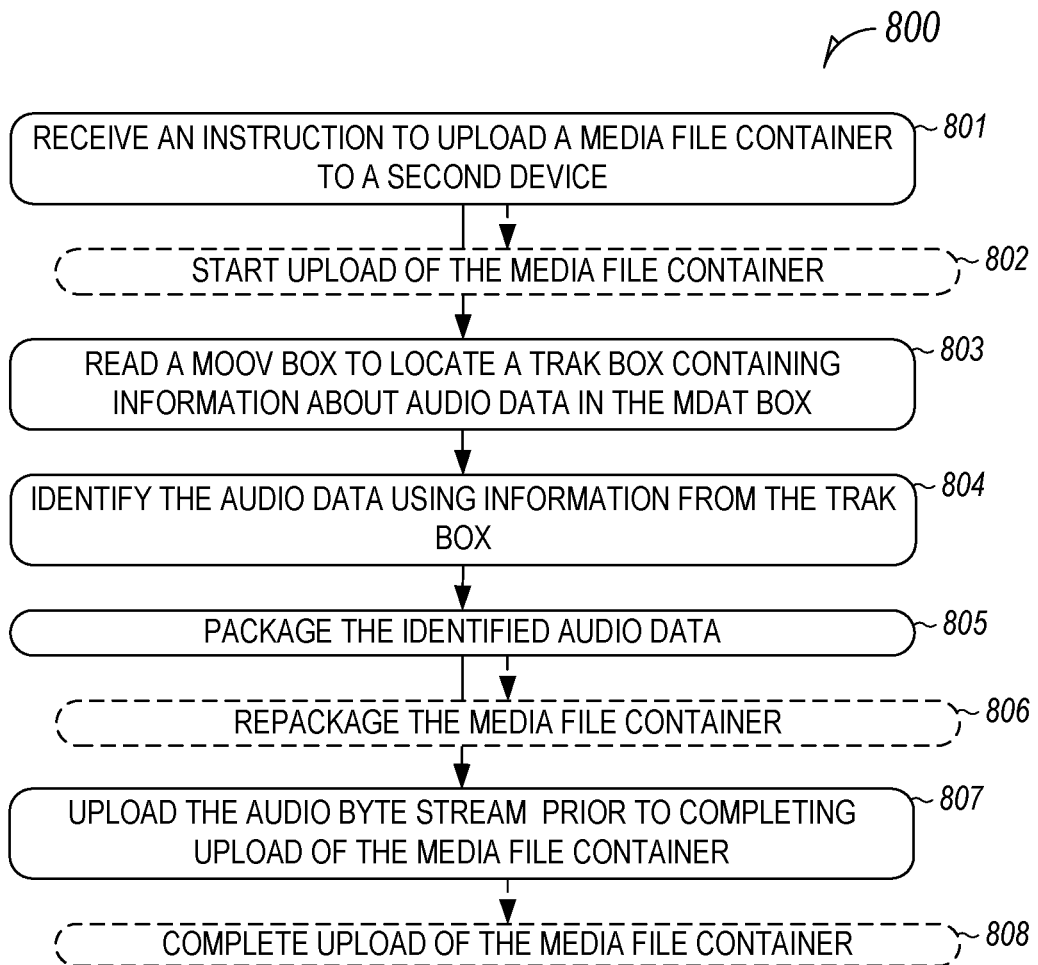
FIG. 8 illustrates an example method of identifying, packaging, and uploading audio data of a media file container from a first device to a second device to improve downstream processes of the second device.

FIG. 8 illustrates an example method 800 of uploading a media file container from a first device, such as using a meeting application executed on the first device, to a second device configured to process or distribute the media file container.

At step 801, an instruction to upload the media file container to the second device can be received, such as by a user of the first device interacting with the meeting application executed on the first device through one or more I/O components of the first device, or one or more other actions, activities, or commands. In response, the first device can perform a series of instructions according to a set of upload rules. The upload rules, in certain examples, can be stored on the first device, such as by a meeting application executed on the first device, etc.

At step 802, upload of the media file container, such as from the first device to the second device, can optionally start. In an example, the first device can provide an upload request to the second device, such as through the meeting application executed on the first device, etc. In other examples, the upload request, and accordingly, the upload, can be delayed until additional processing of the media file container is performed by the first device, or for one or more other reasons (e.g., to occur in a certain time window or with respect to various power, processing, or network status of the first device, etc.), such as described herein.

At step 803, the first device (e.g., the meeting application, etc.) can read a metadata (MOOV) box of the media file container to locate a track (TRAK) box (or TRAF box) containing information about audio data in one or more media data (MDAT) boxes. At step 804, audio data in the one or more MDAT boxes can be identified using information from the TRAK box (e.g., such as a frame rate, time scale, or offset of a specific frame of media data in the MDAT box, etc.).

At step 805, the identified audio data can be packaged into an audio byte stream separate from the MDAT box, such as into a new file, box, or media file container including the audio byte stream representing the audio data of the one or more MDAT boxes separate from the video data of the media file container. At step 806, the first device can optionally repackage the media file container to include the identified audio data as the separate audio track before the video data in the media file container, such as to upload the audio data in the media file container before uploading the video data, as well as metadata of the separate audio track, such as to identify the separate audio track before uploading the video data of the media file container.

At step 807, the audio byte stream can be uploaded from the first device to the second device before completing upload of the media file container. In certain examples, the audio byte stream can be inserted into a transport stream, for example, using a MUX device, separate from or with an upload of the video data of the media file container, but before all video data of the media file container of the media file container is uploaded, or before upload of the media file container is completed. At step 808, upload of the media file container is optionally completed after any or all of steps 801-807.

In an example, uploading the audio byte stream can include creating a schedule for uploading the audio byte stream to the second device prior to completing upload of the media file container and based on the created schedule, completing uploading the audio byte stream to the second device prior to completing the upload of the media file container.

Figure 9:
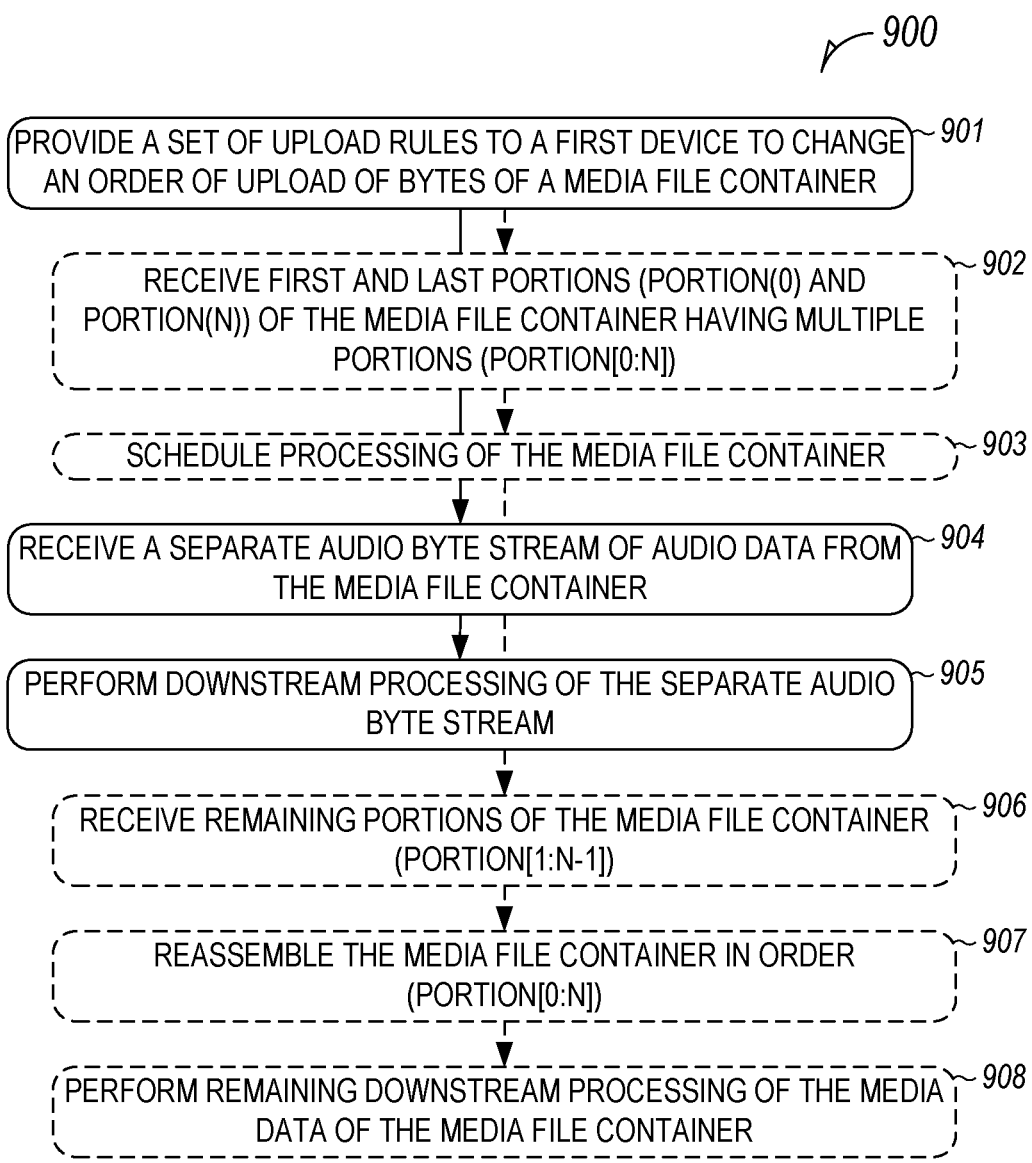
FIG. 9 illustrates an example method of performing downstream processing of a media file container.

FIG. 9 illustrates an example method 900 of receiving a media file container at a second device from a first device and processing media data in the media file container, such as in response to a request to upload the media file container from the first device. Responsive to receiving the request to upload the media file container from the first device, the second device can provide a response to the first device including instructions or one or more upload rules for the first device, for example, using a meeting application executed on the second device, etc.

At step 901, a set of upload rules can be provided from the second device to the first device to change a normal order of upload of bytes of a media file container, transitioning from normal upload operation to a modified upload operation. In an example, the second device can provide the set of upload rules to a meeting application executed on the first device, such as in response to a request to upload a particular media file container, or an upload operation triggered by one or more activities or actions with respect to the meeting application, such as ending a meeting recording, etc. In certain examples, the second device can include or be a portion of a meeting service connected to the meeting application of the first device. In certain examples, a media service can include the meeting service or vice versa.

At step 902, portions of the media file container having multiple portions (e.g., PORTION[0:N]) can be received at the second device, such as first and last portions (e.g., PORTION(0) and PORTION(N)) of the media file container. The last portion of the media file container can be received at the second device directly subsequent to the first portion, before intervening portions (e.g., PORTION[1:N−1]) of the media file container.

At step 903, processing of the media file container can be scheduled based on the received first and last portions (e.g., PORTION(0) and PORTION(N)) of the media file container, before the full media file container is received. For example, the received first and last portions of the media file container can be parsed, searched, or read to identify a MOOV box in one of the first or last portions. The information in the MOOV box can identify the type of media data in the media file container, its duration and encoding, the location of specific types of media data in the media file container, etc. For example, the information in the MOOV box can identify whether the media file container includes audio data, and if so, whether the audio data is interleaved with video data or separated, such as in a separate MDAT box, etc. However, before audio data can be processed by the second device, even after being identified in the MOOV box, all audio data from the media file container has to be received. With a large enough file, this can take a substantial time period, further depending on other things, such as the data connection or power status of the first device, etc.

At step 904, an audio byte stream of the media file container can be received from the first device, before receiving all portions of the media file container, the audio byte stream including extracted audio data by the first device from the media file container, or otherwise received from the first device. At step 905, downstream processing of the received audio byte stream can be performed by the second device.

At step 906, the remainder of the multiple portions (e.g., PORTION[1:N−1]) of the media file container can be received, after receiving the first and last portions (e.g., PORTION(0) and PORTION(N)) of the media file container. At step 907, the received portions (e.g., PORTION[0:N]) of the media file container can be reassembled in order from the first portion of the media file container sequentially to the last portion of the media file container. At step 908, downstream processing of the media data of the media file container can be performed, such as according to the scheduled processing, including one or more of encoding in different bitrates, preparing preview thumbnails at regular intervals through the media data of the media file container, etc.

Figure 10:
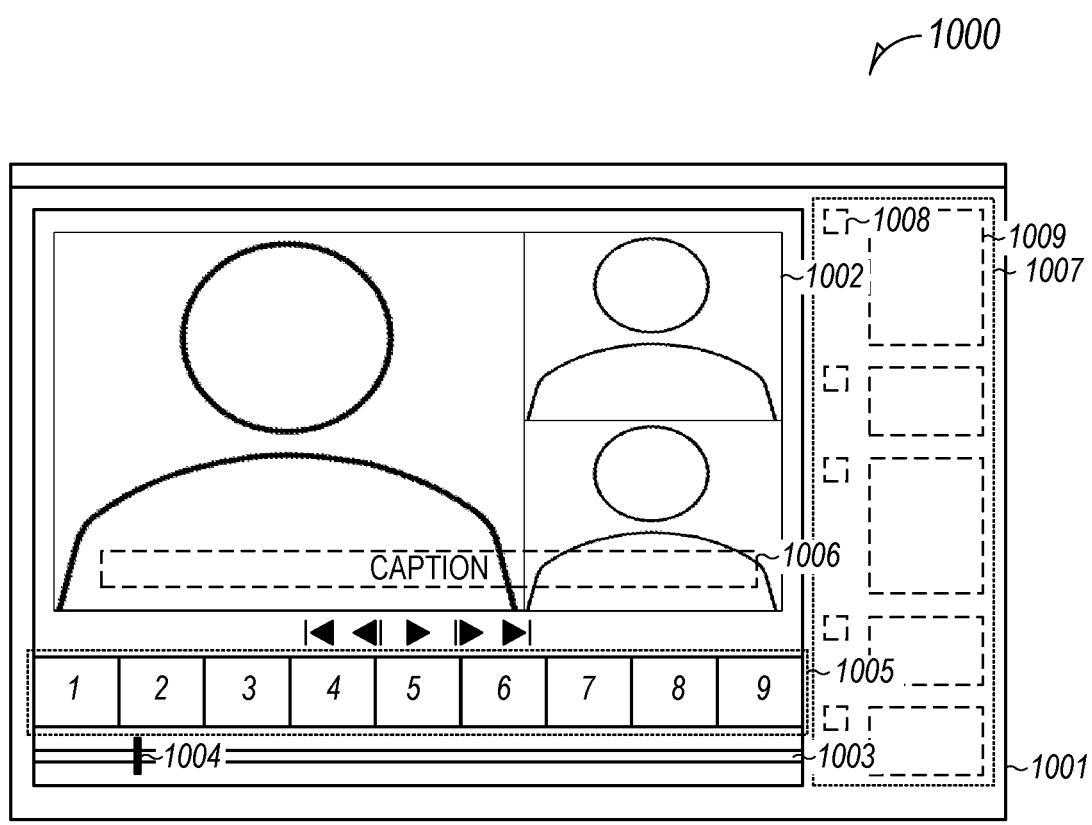
FIG. 10 illustrates an example output of downstream processing of a media file container.

FIG. 10 illustrates an example output 1000 of downstream processing of media data of a media file container by the second device (e.g., of a media service, etc.), including a meeting application 1001 providing a video output 1002 of video data from a media file container, an index bar 1003 allowing navigation through the duration of the video data, a status bar 1004 indicating the position of the video output 1002, example representative images 1005 (e.g., 1 through 9) indicative of selectable frames along the duration of the video data, selection of which can jump navigation to that point in the duration of the video data. A caption box 1006 can provide closed captions or subtitles for the video data as it appears on the video output 1002. A transcript box 1007 includes an identity box 1008 and associated transcript portion 1009 of the speech as heard through the duration of the video data.

Figure 11:
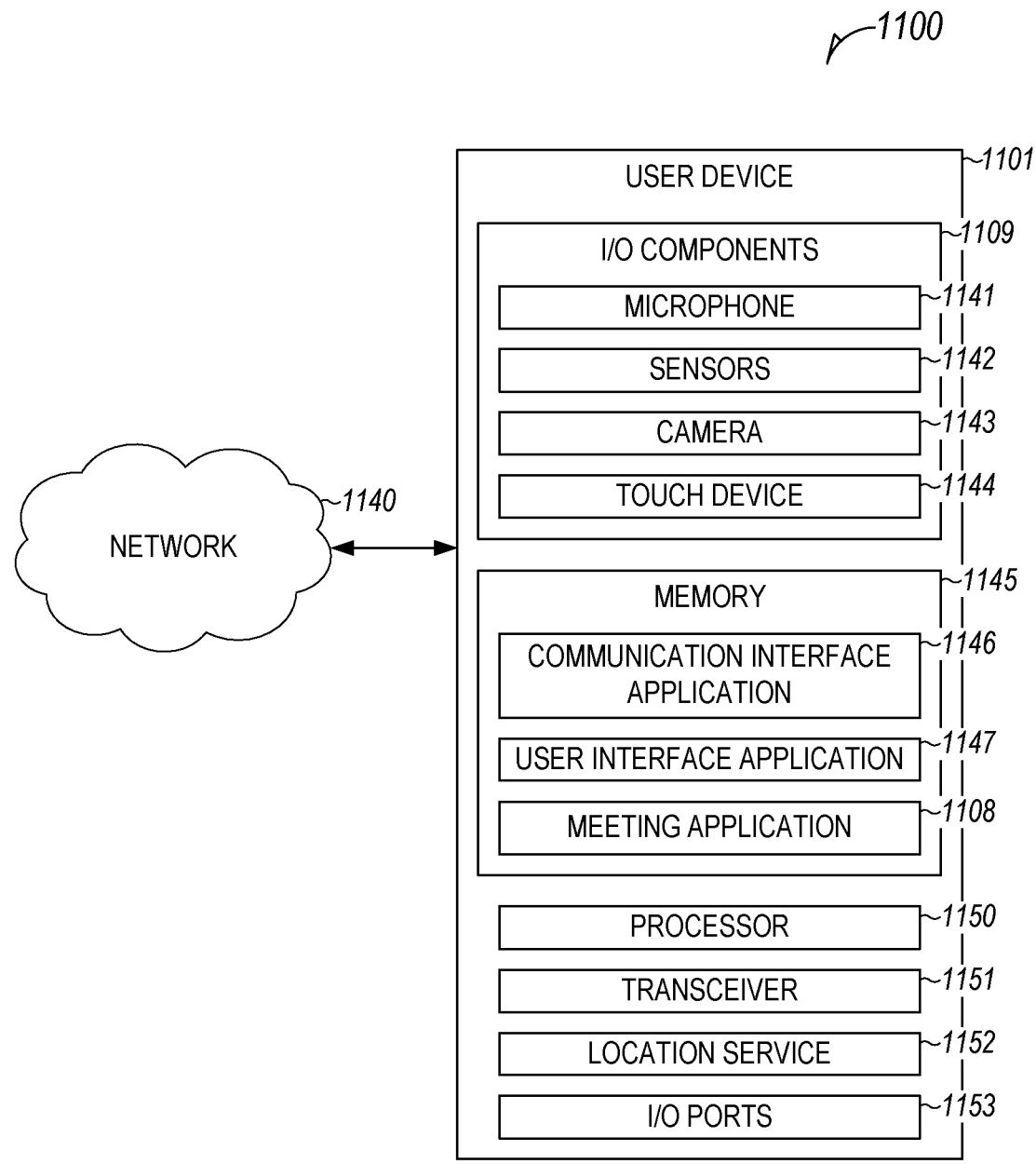
FIG. 11 illustrates an example system including a user device coupled to a network.

FIG. 11 illustrates an example system 1100 including a user device 1101 having one or more I/O components 1109, a memory 1145, a processor 1150, a transceiver 1151, a location service component 1152, and one or more I/O ports 1153. The user device 1101 can take the form of a mobile computing device or any other portable device, such as a mobile telephone, laptop, tablet, computing pad, notebook, gaming device, portable media player, etc. In other examples, the user device 1101 can include a less portable device, such as desktop personal computer, kiosk, tabletop device, industrial control device, etc. Other examples can incorporate the user device 1101 as part of a multi-device system in which two separate physical devices share or otherwise provide access to the illustrated components of the user device 1101.

The processor 1150 can include any quantity of processing units and is programmed to execute computer-executable instructions for implementing aspects of the disclosure. The instructions may be performed by the processor or by multiple processors within the computing device or performed by a processor external to the user device 1101. In some examples, the processor 1150 is programmed to execute methods, such as the one or more method illustrated herein, etc. Additionally, or alternatively, the processor 1150 can be programmed to present an experience in a user interface ("UI"), etc. In certain examples, the processor 1150 can represent an implementation of techniques to perform the operations described herein.

The transceiver 1151 can include an antenna capable of transmitting and receiving radio frequency ("RF") signals and various antenna and corresponding chipsets to provide communicative capabilities between the user device 1101 and one or more other remote devices. Examples are not limited to RF signaling, however, as various other communication modalities may alternatively be used.

The I/O components 1109 can include, without limitation, computer monitors, televisions, projectors, touch screens, phone displays, tablet displays, wearable device screens, televisions, speakers, vibrating devices, and any other devices configured to display, verbally communicate, or otherwise provide information visibly or audibly to a user of the user device 1101. For example, the user device 1101 can include a desktop computer, a laptop computer, a smart phone, or a mobile tablet including speakers capable of displaying images or playing audio to the user of the user device 1101. In other examples, the user device 1101 can include a computer in a car that plays audio to the user of the user device 1101 through a car speaker system, visually presents images on a display screens (e.g., situated in the car's dashboard, within headrests, on a drop-down screen, etc.), or combinations thereof. Other examples present the disclosed presentation material through various other display or audio I/O components 1109.

The I/O components 1109 can include one or more of a microphone 1141, one or more sensors 1142, a camera 1143, or a touch device 1144. The microphone 1141 can capture speech from, by, about, or near the user of the user device 1101. The sensors 1142 can include any number of sensors on or in a mobile computing device, electronic toy, gaming console, wearable device, television, vehicle, or the user device 1101, such as one or more of an accelerometer, magnetometer, pressure sensor, photometer, thermometer, global positioning system ("GPS") chip or circuitry, bar scanner, biometric scanner for scanning fingerprint, palm print, blood, eye, or the like, gyroscope, near-field communication ("NFC") receiver, or any other sensor configured to capture data from the user of the user device 1101 or the environment. The camera 1143 can capture images or video of or by the user of the user device 1101. The touch device 1144 can include a touchpad, track pad, touch screen, or other touch-capturing device. In other examples, the I/O components 1109 can include one or more of a sound card, a vibrating device, a scanner, a printer, a wireless communication component, or any other component for capturing information related to the user of the user device 1101 or the environment. In contrast, the I/O ports 1153 allow the user device 1101 to be logically coupled to other devices and I/O components 1109, some of which may be built into user device 1101 while others may be external.

The memory 1145 can include any quantity of memory associated with or accessible by the user device 1101. The memory 1145 can be internal to the user device 1101, external to the user device 1101, or a combination thereof. The memory 1145 can include, without limitation, random access memory (RAM), read only memory (ROM), electronically erasable programmable read only memory (EEPROM), flash memory or other memory technologies, CDROM, digital versatile disks (DVDs) or other optical or holographic media, magnetic cassettes, magnetic tape, magnetic disk storage or other magnetic storage devices, memory wired into an analog computing device, or any other medium for encoding desired information and for access by the user device 1101. The terms computer-readable medium, machine readable medium, and storage device do not include carrier waves to the extent carrier waves are deemed too transitory. The memory 1145 can take the form of volatile and/or nonvolatile memory, can be removable, non-removable, or a combination thereof; and can include various hardware devices, such as solid-state memory, hard drives, optical-disc drives, etc.

Additionally, or alternatively, the memory 1145 can be distributed across multiple user devices, such as the user device 1101, such as in a virtualized environment in which instruction processing is carried out on multiple ones of the user device 1101. The memory 1145 can store, among other data, various device applications that, when executed by the processor 1150, operate to perform functionality on the user device 1101. Example applications can include search applications, instant messaging applications, electronic-mail application programs, web browsers, calendar application programs, address book application programs, messaging programs, media applications, location-based services, search programs, and the like. The applications may communicate with counterpart applications or services such as web services accessible via the network 1140. For example, the applications can include client-operating applications that correspond to server-side applications executing on remote servers or computing devices in the cloud.

Instructions stored in the memory 1145 can include, among other things, one or more of a communication interface application 1146, a user interface application 1147, and a meeting application 1108. The communication interface application 1146 can include one or more of computer-executable instructions for operating a network interface card and a driver for operating the network interface card. Communication between the user device 1101 and other devices can occur using any protocol or mechanism over a wired or wireless connection or across the network 1140. In some examples, the communication interface application 1146 is operable with RF and short-range communication technologies using electronic tags, such as NFC tags, Bluetooth® brand tags, etc.

In some examples, the user interface application 1147 includes a graphics application for displaying data to the user and receiving data from the user. The user interface application 1147 can include computer-executable instructions for operating the graphics card to display search results and corresponding images or speech on or through one or more of the I/O components 1109. The user interface application 1147 can interact with the various sensors 1142 and camera 1143 to both capture and present information through the I/O components 1109.

The location service component 1152 can be configured to receive information from one or more of the sensors 1142 or transceiver 1151 and to determine a physical location of the user device 1101. In certain examples, the location service component 1152 can receive or determine the physical location using information from one or more wireless networks, including wired or wireless, long- or short-range communication access points, etc., using information from one or more GPS chip or circuitry, or combinations thereof.

Figure 12:
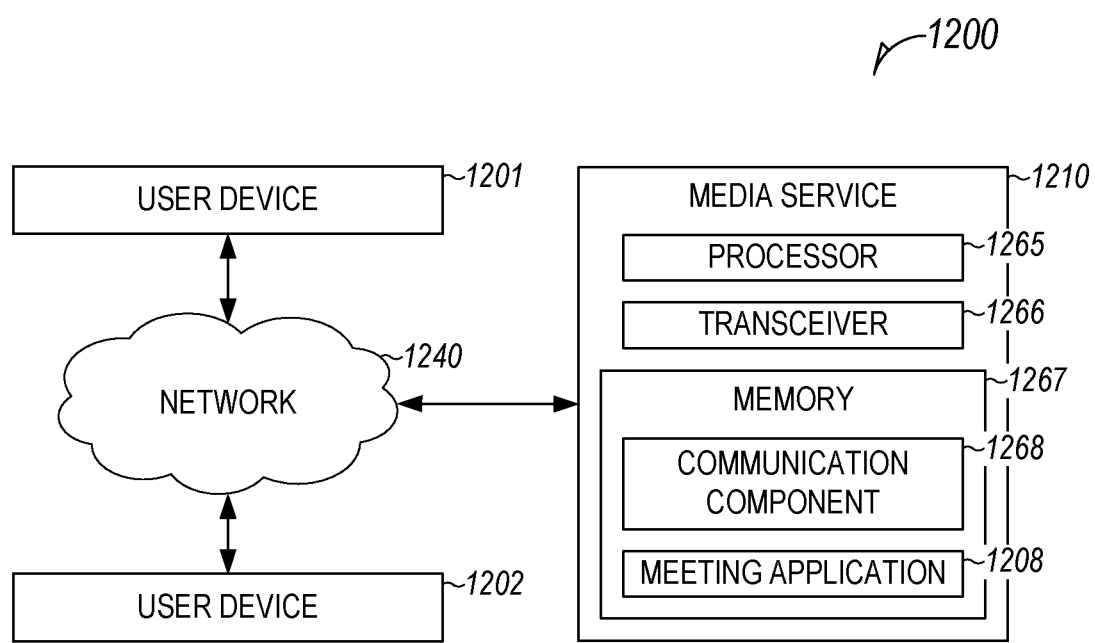
FIG. 12 illustrates an example networking environment including multiple user devices and a media service system communicating over a network.

FIG. 12 illustrates an example networking environment 1200 including one or more user devices, such as first and second devices 1201, 1202 and a media service 1210 (e.g., a media service system) communicating over a network 1240. In some examples, interaction between one or more of the components described herein, such as between meeting applications of respective user devices, can be managed over the network 1240 by the media service 1210. In certain examples, the media service 1210 can facilitate unified communication sessions between multiple participants.

The networking environment 1200 illustrated in FIG. 12 is an example of one suitable computing system environment and is not intended to suggest any limitation as to the scope of use or functionality of examples disclosed herein. The illustrated networking environment 1200 should not be interpreted as having any dependency or requirement related to any single component, module, index, or combination thereof, and in other examples, other network environments are contemplated.

The network 1240 can include the internet, a private network, a local area network (LAN), a wide area network (WAN), or any other computer network, including various network interfaces, adapters, modems, and other networking devices for communicatively connecting the user devices and the media service 1210. The network 1240 can also include configurations for point-to-point connections.

The first and second devices 1201, 1202 include any type of user device discussed herein. Each user device can capture user or environment data from their respective users and communicate the captured user and environment data over the network 1240 to the media service 1210, such as using a communication component or transceiver, as discussed herein. In response, a communication component 1268 of the media service 1210 can be capable of providing and receiving messages including images, videos, audio, text, and other various communication media to and from the user devices over the network 1240.

The first and second devices 1201, 1202 can include various software applications and presentation components for communicating via a message thread associated with respective unified communication sessions attended by users of the first and second devices 1201, 1202. For example, a mobile phone can display a meeting application (e.g., Microsoft Teams application) for communicating with other attendees of a virtual or hybrid meeting.

The media service 1210 can include a server or collection of servers configured to execute different web-service computer-executable instructions. The media service 1210 includes a processor 1265 to process executable instructions, a transceiver 1266 to communicate over the network 1240, and a memory 1267 embodied with at least the following executable instructions: a communication component 1268, a meeting application 1208 configured to perform server or cloud-based services associated with a unified communication session, including multimedia services, such as reading, repackaging, reassembling, or otherwise processing or creating media files and content associated with a media file or media data in one or more media file containers, etc. The media service 1210 can additionally include one or more other modules or components, such as a roster component, an image recognition component, or one or more other component, etc. While the communication component 1268 is illustrated as a single box, it is not so limited, and can be scalable. For example, the communication component 1268 can include multiple servers operating various portions of software that collectively manage a hybrid meeting environment.

The first and second devices 1201, 1202 can provide information about one or more users, such as a user profile, accessible over the network 1240 by the media service 1210 to assist in providing services to the one or more user devices. Herein, a "user profile" refers to an electronically stored collection of information related to the user. Such information can be stored based on a user's explicit agreement or "opt-in" to having such personal information be stored, the information including the user's name, age, gender, height, weight, demographics, current location, residency, citizenship, family, friends, schooling, occupation, hobbies, skills, interests, Web searches, health information, birthday, anniversary, celebrated holidays, moods, user condition, and any other personalized information associated with the user, including biometric information. The user profile includes static profile elements (e.g., name, birthplace, etc.), and dynamic profile elements that change over time (e.g., residency, age, condition, etc.). The user profile can be built through probing questions to the user or through analyzing user behavior on one or more user devices.

The present disclosure relates to systems and methods for managing in-room meeting participants of a hybrid meeting according to at least the examples provided in the sections below:

(A1) In one aspect, some embodiments or examples include uploading a media file container from a first device to a second device configured to process media data in the media file container, including receiving an instruction to upload the media file container to the second device, and in response, performing, using the first device, a series of instructions according to a set of upload rules, including identifying a first portion of the media file container and a last portion of the media file container, each of the first and last portions having a size in bytes and including at least a portion of at least one box of the media file container, creating a schedule for uploading the first portion of the media file container and the last portion of the media file container before intervening portions of the media file container between the first and last portions, and based on the created schedule, completing uploading of the first and last portions of the media file container before completing the upload of the intervening portions of the media file container.

(A2) In some embodiments of A1, the media file container includes a file type box, a metadata box, and one or more media data boxes including media data of the media file container, and the first and last portions of the media file container are prescribed byte ranges of the media file container, wherein the first portion of the media file container includes a first prescribed byte range at the beginning of the media file container and the last portion of the media file container includes a last prescribed byte range up to and included the last byte at the end of the media file container.

(A3) In some embodiments of A1-A2, the metadata box is in one of the first portion of the media file container or the last portion of the media file container.

(A4) In some embodiments of A1-A3, completing uploading the first and last portions of the media file container before completing the upload of the intervening portions includes completing uploading the metadata box in one of the first or last portions of the media file container before completing upload of the majority of the media data in the media file container, without first determining which of the first and last portions of the media file container includes the metadata box, and without altering the location of the metadata box in the media file container.

(A5) In some embodiments of A1-A4, the first prescribed byte range and the last prescribed byte range are the same size, each less than half of a total size of the media file container.

(A6) In some embodiments of A1-A5, performing the series of instructions according to the set of upload rules includes uploading the intervening portions of the media file container in sequence after uploading the first portion and the last portion of the media file container, and completing uploading the first portion of the media file container and the last portion of the media file container includes uploading by the first device to the second device.

(A7) In some embodiments of A1-A6, performing the series of instructions according to the set of upload rules includes automatically performing the series of instructions by the first device, and receiving the instruction to upload the media file includes receiving, from the second device, the set of upload rules through the meeting application executed on the first device or in a response to a request to upload the media file container to the second device.

(B1) In one aspect, some embodiments or examples include uploading a media file container from a first device to a second device configured to process media data in the media file container, including receiving an instruction to upload the media file container from a first device to the second device, and, at a first device, identifying a first portion of the media file container and a last portion of the media file container, each of the first and last portions having a size in bytes and including at least a portion of at least one box of the media file container; and creating a schedule to upload the first portion of the media file container and the last portion of the media file container before intervening portions of the media file container between the first and last portions and, based on the created schedule, completing upload of the first and last portions of the media file container before completing the upload of the intervening portions of the media file container to the second device.

(B2) In some embodiments of B1, the media file container includes a file type box, a metadata box, and one or more media data boxes including media data of the media file container, and the first and last portions of the media file container are prescribed byte ranges of the media file container, wherein the first portion of the media file container includes a first prescribed byte range at the beginning of the media file container and the last portion of the media file container includes a last prescribed byte range up to and included the last byte at the end of the media file container.

(B3) In some embodiments of B1-B2, the metadata box is in one of the first portion of the media file container or the last portion of the media file container, and completing upload the first and last portions of the media file container before the intervening portions includes to complete upload of the metadata box in one of the first or last portions of the media file container before completing upload of the majority of the media data in the media file container, without first determining which of the first and last portions of the media file container includes the metadata box, and without altering the location of the metadata box in the media file container.

(B4) In some embodiments of B1-B3, the first prescribed byte range and the last prescribed byte range are the same size, each less than half of a total size of the media file container.

(B5) In some embodiments of B1-B4, the embodiments or examples further include, at the second device, receiving the uploaded first and last portions of the media file container from the first device, parsing the received first and last portions of the media file container to identify the metadata box in one of the received first and last portions of the media file container, and responsive to identifying the metadata box, reading the first four bytes of the metadata box to determine the size of the metadata box in the media file container, wherein the second four bytes of the metadata box identifies the name or type of the box as the metadata box, and reading the remaining bytes of the metadata box to determine information about the media data of one or more media data boxes of the media file container, including a duration and type of the media data in the media file container, before fully receiving all bytes of the media file container.

(B6) In some embodiments of B1-B5, scheduling processing of the media file container based on the information about the media data read in the remaining bytes of the metadata box, including the duration and type of the media data in the media file container, before fully receiving all bytes of the media file container.

(B7) In some embodiments of B1-B6, receiving, after the first and last portions of the media file container, the intervening portions of the media file container from the first device, re-assembling the received media file container in order, and performing downstream processing of the re-assembled media file container.

(C1) In one aspect, some embodiments or examples include uploading a media file container from a first device to a second device configured to process or distribute the media file container, including receiving an instruction to upload the media file container to the second device, and in response, performing a series of instructions according to a set of upload rules including reading a metadata box of the media file container to locate a track box containing information about video data in a media data box, identifying sample frames of the video data throughout a duration of the video data in the media data box using information from the track box, packaging the identified sample frames, creating a schedule for uploading the packaged sample frames of the video data prior to completing upload of the media file container, and based on the created schedule, completing uploading of the packaged sample frames of the video data prior to completing the upload of the media file container.

(C2) In some embodiments of C1, the media data box includes a plurality of fragments, each fragment including a fragment metadata box and a corresponding fragment media data box, wherein each fragment metadata box includes a fragment track box, reading the metadata box of the media file to locate the track box includes reading the metadata box to identify which fragments of the media data box contain video data, and reading the fragment metadata boxes of the identified fragments to locate the fragment track boxes of the identified fragments containing information about video data in the respective identified fragment media data boxes, identifying the sample frames of the video data in the media data box includes identifying the sample frames of the video data in the identified fragment media data boxes using information from the identified fragment track boxes, and packaging the identified sample frames includes packaging the identified sample frames from the identified fragment media data boxes into a separate box or container file different than the identified fragment media data boxes.

(C3) In some embodiments of C1-C2, identifying sample frames includes identifying sample frames from respective points in time within set time intervals across a duration of the video data in the media file container to provide an image preview across the duration of the video data.

(C4) In some embodiments of C1-C3, identifying sample frames includes identifying non-successive sample frames from a sub-interval of a duration of the video data to provide an image preview of the sub-interval of video data.

(C5) In some embodiments of C1-C4, packaging the identified sample frames includes extracting the identified sample frames, reducing a size of the extracted sample frames to create thumbnail images of the respective extracted sample frames, and packaging the thumbnail images into a thumbnail container for upload.

(C6) In some embodiments of C1-05, completing uploading the package of extracted sample frames includes completing uploading the packaged thumbnail container as a separate container file prior to completing the upload of the media file container.

(C7) In some embodiments of C1-C6, packaging the identified samples includes repackaging the media file container to include the identified sample frames, including creating a separate track box for the identified sample frames in the repackaged media file container, and completing uploading the package of identified sample frames includes completing uploading the repackaged media file container.

(C8) In some embodiments of C1-C7, performing the series of instructions according to the set of upload rules includes identifying a first portion of the media file container and a last portion of the media file container, each portion having a size in bytes and including at least a portion of at least one box of the media file container, creating a schedule for uploading the first portion of the media file container and the last portion of the media file container before intervening portions of the media file container between the first and last portions, and based on the created schedule, completing uploading of the first and last portions of the media file container before completing uploading of the intervening portions of the media file container.

(C9) In some embodiments of C1-C8, completing uploading the packaged sample frames of the video data includes after completing uploading the first and last portions of the media file container, and before completing uploading of the intervening portions of the media file container.

(C10) In some embodiments of C1-C9, performing the series of instructions according to the set of upload rules includes automatically performing the series of instructions by the first device, and the second device is configured to provide the set of upload rules to the first device through the meeting application executed on the first device or in a response to a request to upload the media file container to the second device.

(D1) In one aspect, some embodiments or examples for uploading a media file container from a first device to a second device configured to process or distribute the media file container, including, responsive to receiving an instruction to upload the media file container to the second device, performing, using the first device, a series of instructions according to a set of upload rules, including reading a metadata box of the media file container to locate a track box containing information about audio data, including a size and a location of the audio data, in a media data box of the media file container, identifying the audio data in the media data box using the information from the track box, packaging the identified audio data from the media data box into an audio byte stream separate from the media data box, creating a schedule for uploading the audio byte stream to the second device prior to completing upload of the media file container, and, based on the created schedule, completing uploading the audio byte stream to the second device prior to completing the upload of the media file container.

(D2) In some embodiments of D1, packaging the identified audio data into the audio byte stream includes packaging the identified audio data into a separate container file including the audio byte stream, and completing uploading the audio byte stream includes completing uploading the separate container file prior to completing the upload of the media file container.

(D3) In some embodiments of D1-D2, the audio data in the media data box includes audio data associated with corresponding video data, the media data box includes a plurality of fragments, each fragment including a fragment metadata box and a corresponding fragment media data box, wherein each fragment metadata box includes a fragment track box, reading the metadata box of the media file to locate the track box includes reading the metadata box to identify which fragments of the media data box contain audio data and reading the fragment metadata boxes of the identified fragments to locate the fragment track boxes of the identified fragments containing information about audio data in the respective identified fragment media data boxes.

(D4) In some embodiments of D1-D3, identifying the audio data in the media data box includes identifying the audio data in the identified fragment media data boxes using information from the identified fragment track boxes.

(D5) In some embodiments of D1-D4, packaging the identified audio data into the audio byte stream includes packaging the identified audio data into a separate fragment media data box for the audio byte stream, and completing uploading the audio byte stream includes completing uploading the separate fragment media data box prior to completing the upload of the media file container.

(D6) In some embodiments of D1-D5, packaging the identified audio data includes repackaging the media file container to include the audio byte stream, including creating a separate track box for the audio byte stream in the repackaged media file container, and completing uploading the audio byte stream includes uploading the repackaged media file container.

(D7) In some embodiments of D1-D6, performing the series of instructions according to the set of upload rules includes identifying a first portion of the media file container and a last portion of the media file container, each of the first and last portions having a size in bytes and including at least a portion of at least one box of the media file container, creating a schedule for uploading the first portion of the media file container and the last portion of the media file container before intervening portions of the media file container between the first and last portions, and, based on the created schedule, completing uploading of the first and last portions of the media file container before completing uploading of the intervening portions of the media file container.

(D8) In some embodiments of D1-D7, completing uploading the audio byte stream includes after completing uploading the first and last portions of the media file container, and before completing uploading of the intervening portions of the media file container.

(D9) In some embodiments of D1-D8, performing the series of instructions according to the set of upload rules includes automatically performing the series of instructions by the first device, and the second device is configured to provide the set of upload rules to the first device through the meeting application executed on the first device.

(D10) In some embodiments of D1-D9, performing the series of instructions according to the set of upload rules includes automatically performing the series of instructions by the first device, wherein the second device is configured to provide the set of upload rules to the first device in a response to a request to upload the media file container to the second device.

In yet another aspect, some embodiments include a system including a processor and a memory device coupled to the processor and having a program stored thereon for execution by the processor to perform operations including any of the embodiments of A1-A7, B1-B7, C1-C10, or D1-D10 described above in various combinations or permutations. In yet another aspect, some embodiments include a non-transitory computer-readable storage medium storing one or more programs for execution by one or more processors of a storage device, the one or more programs including instructions for performing any of the embodiments of A1-A7, B1-B7, C1-C10, or D1-D10 described above in various combinations or permutations. In yet another aspect, some embodiments include a method or a system including means for performing any of the embodiments of A1-A7, B1-B7, C1-C10, or D1-D10 described above in various combinations or permutations.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

In the description herein, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized, and that structural, logical, and electrical changes may be made without departing from the scope of the present invention. The included description of example embodiments is, therefore, not to be taken in a limited sense, and the scope of the present invention is defined by the appended claims.

The functionality can be configured to perform an operation using, for instance, software, hardware, firmware, or the like. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware. The term, "logic" encompasses any functionality for performing a task. For instance, each operation illustrated in the flowcharts corresponds to logic for performing that operation. An operation can be performed using, software, hardware, firmware, or the like. The terms, "component," "system," and the like may refer to computer-related entities, hardware, and software in execution, firmware, or combination thereof. A component may be a process running on a processor, an object, an executable, a program, a function, a subroutine, a computer, or a combination of software and hardware. The term, "processor," may refer to a hardware component, such as a processing unit of a computer system.

Furthermore, the claimed subject matter may be implemented as a method, apparatus, or article of manufacture using standard programming and engineering techniques to produce software, firmware, hardware, or any combination thereof to control a computing device to implement the disclosed subject matter. The term, "article of manufacture," as used herein is intended to encompass a computer program accessible from any computer-readable storage device or media. Computer-readable storage media can include, but are not limited to, magnetic storage devices, hard disk, floppy disk, magnetic strips, optical disk, compact disk (CD), digital versatile disk (DVD), smart cards, flash memory devices, among others. In contrast, computer-readable media (i.e., not storage media) may additionally include communication media such as transmission media for wireless signals and the like.

What is claimed is:

1. A system for uploading a media file container from a first device to a second device configured to process or distribute the media file container, comprising:
   one or more processors; and a memory storing computer-executable instructions that, when executed, cause the one or more processors to control the system to perform operations comprising:

responsive to receiving an instruction to upload the media file container to the second device, performing a series of instructions according to a set of upload rules, comprising:

reading a metadata box of the media file container to locate a track box containing information about video data in a media data box of the media file container;

identifying sample frames of the video data throughout a duration of the video data in the media data box using information from the track box;

packaging the identified sample frames;

creating a schedule for uploading the packaged sample frames of the video data prior to completing upload of the media file container; and based on the created schedule, completing uploading of the packaged sample frames of the video data prior to completing the upload of the media file container.

2. The system of claim 1, wherein the media data box includes a plurality of fragments, each fragment including a fragment metadata box and a corresponding fragment media data box, wherein each fragment metadata box includes a fragment track box, wherein reading the metadata box of the media file to locate the track box includes reading the metadata box to identify which fragments of the media data box contain video data, and reading the fragment metadata boxes of the identified fragments to locate the fragment track boxes of the identified fragments containing information about video data in the respective identified fragment media data boxes, wherein identifying the sample frames of the video data in the media data box includes identifying the sample frames of the video data in the identified fragment media data boxes using information from the identified fragment track boxes, and wherein packaging the identified sample frames includes packaging the identified sample frames from the identified fragment media data boxes into a separate box or container file different than the identified fragment media data boxes.

3. The system of claim 1, wherein identifying sample frames includes identifying sample frames from respective points in time within set time intervals across a duration of the video data in the media file container to provide an image preview across the duration of the video data.

4. The system of claim 1, wherein identifying sample frames includes identifying non-successive sample frames from a sub-interval of a duration of the video data to provide an image preview of the sub-interval of video data.

5. The system of claim 1, wherein packaging the identified sample frames comprises:

extracting the identified sample frames;

reducing a size of the extracted sample frames to create thumbnail images of the respective extracted sample frames; and packaging the thumbnail images into a thumbnail container for upload, and wherein completing uploading the package of extracted sample frames includes completing uploading the packaged thumbnail container as a separate container file prior to completing the upload of the media file container.

6. The system of claim 1, wherein packaging the identified samples comprises:

repackaging the media file container to include the identified sample frames, including creating a separate track box for the identified sample frames in the repackaged media file container, and wherein completing uploading the package of identified sample frames includes completing uploading the repackaged media file container.

7. The system of claim 1, wherein performing the series of instructions according to the set of upload rules includes:

identifying a first portion of the media file container and a last portion of the media file container, each portion having a size in bytes and including at least a portion of at least one box of the media file container;

creating a schedule for uploading the first portion of the media file container and the last portion of the media file container before intervening portions of the media file container between the first and last portions; and based on the created schedule, completing uploading of the first and last portions of the media file container before completing uploading of the intervening portions of the media file container, and wherein completing uploading the packaged sample frames of the video data includes after completing uploading the first and last portions of the media file container, and before completing uploading of the intervening portions of the media file container.

8. The system of claim 1, wherein performing the series of instructions according to the set of upload rules includes automatically performing the series of instructions by the first device, and wherein the second device is configured to provide the set of upload rules to the first device through the meeting application executed on the first device or in a response to a request to upload the media file container to the second device.

9. A method for uploading a media file container from a first device to a second device configured to process or distribute the media file container, comprising:

receiving an instruction to upload the media file container to the second device, and in response, performing a series of instructions according to a set of upload rules, comprising:

reading a metadata box of the media file container to locate a track box containing information about video data in a media data box of the media file container;

identifying sample frames of the video data throughout a duration of the video data in the media data box using information from the track box;

packaging the identified sample frames;

creating a schedule for uploading the packaged sample frames of the video data prior to completing upload of the media file container; and based on the created schedule, completing uploading of the packaged sample frames of the video data prior to completing the upload of the media file container.

10. The method of claim 9, wherein the media data box includes a plurality of fragments, each fragment including a fragment metadata box and a corresponding fragment media data box, wherein each fragment metadata box includes a fragment track box, wherein reading the metadata box of the media file to locate the track box includes reading the metadata box to identify which fragments of the media data box contain video data, and reading the fragment metadata boxes of the identified fragments to locate the fragment track boxes of the identified fragments containing information about video data in the respective identified fragment media data boxes, wherein identifying the sample frames of the video data in the media data box includes identifying the sample frames of the video data in the identified fragment media data boxes using information from the identified fragment track boxes, and wherein packaging the identified sample frames includes packaging the identified sample frames from the identified fragment media data boxes into a separate box or container file different than the identified fragment media data boxes.

11. The method of claim 9,
wherein identifying sample frames includes identifying sample frames from respective points in time within set time intervals across a duration of the video data in the media file container to provide an image preview across the duration of the video data.

12. The method of claim 9,
wherein identifying sample frames includes identifying non-successive sample frames from a sub-interval of a duration of the video data to provide an image preview of the sub-interval of video data.

13. The method of claim 9,
wherein packaging the identified sample frames comprises:
extracting the identified sample frames;
reducing a size of the extracted sample frames to create thumbnail images of the respective extracted sample frames; and
packaging the thumbnail images into a thumbnail container for upload, and
wherein completing uploading the package of extracted sample frames includes completing uploading the packaged thumbnail container as a separate container file prior to completing the upload of the media file container.

14. The method of claim 9,
wherein packaging the identified samples comprises:
repackaging the media file container to include the identified sample frames, including creating a separate track box for the identified sample frames in the repackaged media file container, and
wherein completing uploading the package of identified sample frames includes completing uploading the repackaged media file container.

15. The method of claim 9,
wherein performing the series of instructions according to the set of upload rules includes:
identifying a first portion of the media file container and a last portion of the media file container, each portion having a size in bytes and including at least a portion of at least one box of the media file container;
creating a schedule for uploading the first portion of the media file container and the last portion of the media file container before intervening portions of the media file container between the first and last portions; and
based on the created schedule, completing uploading of the first and last portions of the media file container before completing uploading of the intervening portions of the media file container, and wherein completing uploading the packaged sample frames of the video data includes after completing uploading the first and last portions of the media file container, and before completing uploading of the intervening portions of the media file container.

16. The method of claim 9,
wherein performing the series of instructions according to the set of upload rules includes automatically performing the series of instructions by the first device, and
wherein receiving the instruction to upload the media file includes receiving, from the second device, the set of upload rules through the meeting application executed on the first device or in a response to a request to upload the media file container to the second device.

17. A system for uploading a media file container from a first device to a second device configured to process or distribute the media file container, comprising:
means for performing a series of instructions according to a set of upload rules responsive to receiving an instruction to upload the media file container to the second device, comprising:
means for reading a metadata box of the media file container to locate a track box containing information about video data in a media data box of the media file container;
means for identifying sample frames of the video data throughout a duration of the video data in the media data box using information from the track box;
means for packaging the identified sample frames; and
means for uploading the packaged sample frames of the video data to the second device prior to completing upload of the media file container.

18. The system of claim 17,
wherein the media data box includes a plurality of fragments, each fragment including a fragment metadata box and a corresponding fragment media data box, wherein each fragment metadata box includes a fragment track box,
wherein the means for reading the metadata box of the media file to locate the track box include means for reading the metadata box to identify which fragments of the media data box contain video data, and reading the fragment metadata boxes of the identified fragments to locate the fragment track boxes of the identified fragments containing information about video data in the respective identified fragment media data boxes,
wherein the means for identifying the sample frames of the video data in the media data box includes means for identifying the sample frames of the video data in the identified fragment media data boxes using information from the identified fragment track boxes, and
wherein the means for packaging the identified sample frames includes means for packaging the identified sample frames from the identified fragment media data boxes into a separate box or container file different than the identified fragment media data boxes.

19. The system of claim 17,
wherein the means for packaging the identified sample frames comprises means for:
extracting the identified sample frames;
reducing a size of the extracted sample frames to create thumbnail images of the respective extracted sample frames; and
packaging the thumbnail images into a thumbnail container for upload, and
wherein the means for uploading the package of extracted sample frames includes means for completing uploading the packaged thumbnail container as a separate container file prior to completing the upload of the media file container.

20. The system of claim 17,
wherein the means for packaging the identified samples comprises means for repackaging the media file container to include the identified sample frames, including creating a separate track box for the identified sample frames in the repackaged media file container, and
wherein the means for uploading the package of identified sample frames includes means for completing uploading the repackaged media file container.

\* \* \* \* \*